United States Patent [19]

Sakaguchi et al.

[11] 3,956,212

[45] May 11, 1976

[54] ETHYLENE RESIN COMPOSITION

[75] Inventors: Fumio Sakaguchi, Yokohama; Tadao Suzuji; Isamu Yamazaki, both of Kawasaki, all of Japan

[73] Assignee: Showa Denko Kabushiki Kaisha, Tokyo, Japan

[22] Filed: Mar. 21, 1973

[21] Appl. No.: 343,334

[30] Foreign Application Priority Data
Mar. 23, 1972 Japan............................ 47-28580

[52] U.S. Cl................ 260/23 H; 260/23 XA; 260/42.28; 260/42.44; 260/42.45; 260/42.46; 260/42.47; 260/42.49; 260/42.52; 260/45.7 R; 428/461
[51] Int. Cl.².................... C08K 3/22; C08K 5/09
[58] Field of Search.......... 260/42.46, 42.28, 42.44, 260/42.45, 42.47, 42.49, 42.52, 45.7 R, 23 H, 23 XA

[56] References Cited
UNITED STATES PATENTS

| 3,248,359 | 4/1966 | Maloncy | 260/41 |
|---|---|---|---|
| 3,563,939 | 2/1971 | Stevens | 260/37 |
| 3,694,403 | 9/1972 | Aishima et al. | 260/41 R |

FOREIGN PATENTS OR APPLICATIONS

| 1,044,503 | 10/1966 | United Kingdom | 260/41 |

*Primary Examiner*—James H. Derrington
*Attorney, Agent, or Firm*—Sughrue, Rothwell, Mion, Zinn & Macpeak

[57] ABSTRACT

An ethylene resin composition comprising an ethylene polymer, or a copolymer of ethylene with one or more components copolymerizable with ethylene, and alumina trihydrate having a gibbsite crystal structure, and various moldings produced from the ethylene resin composition having excellent physical and chemical properties are disclosed.

54 Claims, No Drawings

ETHYLENE RESIN COMPOSITION

BACKGROUND OF THE INVENTION

1. Field of the Invention

This invention relates to an ethylene resin composition comprising an ethylene polymer, or a copolymer of ethylene and a component(s) copolymerizable with ethylene, and alumina trihydrate having a gibbsite crystal structure.

2. Description of the Prior Art

Resin compositions comprising more than 100 parts by weight of various reinforcing inorganic fillers per 100 parts by weight of olefinic polymers, such as ethylene polymers or propylene polymers, are well known in the art as disclosed in, for example, Japanese Pat. Publication No. 29377/71 and British Pat. No. 93,6057.

Although these resin compositions can be obtained at low cost and more improved in certain physical properties, these resin compositions have disadvantages in that the fillers lower the inherent physical properties of moldings produced from such resin compositions and it is very difficult to incorporate a large amount of inorganic fillers, e.g., more than 70% by weight based on the weight of the olefinic polymers. Further, it is difficult to obtain moldings having a uniform composition from a mixture of olefinic polymers and inorganic fillers even if a large amount of fillers could be incorporated into the olefinic polymers. In thermoplastic resins generally used, it is also necessary to use fillers having low cost in order to avoid economical problems.

Compositions comprising olefinic polymers and above reinforcing inorganic fillers, for example, $\beta$-type alumina hydrate as disclosed in Japanese Patent Publication No. 8037/65, show high modulus, tensile strength and hardness, but they also exhibit low flexibility, tear strength and toughness. When smaller proportions of inorganic fillers are used in these compositions to eliminate the above disadvantages, the flexibility and tear strength are improved to a certain degree but mixing costs increase, and economically advantageous products cannot be obtained. Further, when proportions of inorganic fillers are decreased, i.e., the olefinic polymers are used in a large proportion, the products obtained from such resin compositions evolve considerable heat when they are subjected to combustion, e.g., when burned as a rubbish after use, and such products give forth large volumes of black smoke or soot during combustion. In addition, these products are readily flammable and are not suitable for use as structural materials.

Resin compositions comprising a large proportion of alumina trihydrate having a gibbsite crystalline structure are excellent in flexibility, and sheets or films produced from such compositions generally retain a waxy feeling on their surfaces but are not said to be excellent in marking and printing properties. This is due to the fact that the surfaces of the sheets or films lack roughness and/or a hydrophilic property in view of the nature of lipophilic thermoplastic resins. Further, a composition comprising a thermoplastic resin and aluminum hydroxide, which has been subjected to removal of free water and subsequently dried (obtainable from sodium aluminate in the production of alumina hydrate (aluminum hydroxide)) generally exhibits poor dispersibility because of partial aggregation of the particles, and moldings produced from such a composition sometimes have undesirable spots on the surfaces of the moldings and lack a uniform hydrophilic property.

In order to improve the hydrophilic property, a method comprising immersing the moldings in an aqueous solution of sodium hydroxide having a high concentration or in concentrated sulfuric acid at high temperature and for a long period of time to elute the aluminum hydroxide contained in the moldings has been proposed. Though this method improves the printing and marking properties of the moldings to a certain extent, it also deteriorates or deforms the moldings and adversely affects the mechanical properties of the moldings since the moldings are subjected to severe conditions.

The present invention also contemplates a bonded laminate comprising moldings of the resin composition of the present invention and articles of metals. Bonded laminates of this type are now widely used in transportation facilities such as vehicles, ships and the like and in structural materials. These bonded laminates have various advantages such as lightness, good corrosion resistance, and good, heat insulation capability, as well as being inexpensive, all of which are characteristic features inherent in thermoplastic resins. The bonded laminates also have excellent mechanical properties such as impact strength and toughness which are characteristic features inherent in metals.

More recently, the demand for bonded laminates having excellent heat-resistance and non-flammability in addition to the above advantages has steadily increased in the architectural field. However, it was well known that thermoplastic resins such as polyolefin resins, e.g., polyethylene resin, polypropylene resin, etc., cannot be effectively bonded to metals. Various processes have heretofore been proposed for bonding thermoplastic resins to metals, for example, a process for activating the surface of the thermoplastic resins by ionization with $\gamma$-rays, ozone oxidation or high temperature treatment (for example, see Japanese Pat. Application Publication No. 11836/63), a process comprising subjecting polyethylene to thermal degradation and subsequently modifying it with maleic anhydride (for example, see Japanese Pat. Application Publication No. 8728/69), a process comprising modifying polypropylene with maleic anhydride (for example, see Japanese Pat. Application Publication No. 10757/1967) and a process comprising using a graft copolymer (for example, see Japanese Pat. Application Publication No. 27235/1970).

These prior art processes do, in fact, improve the adhesiveness of thermoplastic resin moldings to other articles to a certain extent, but they are accompanied with some disadvantages in that adhesiveness is still insufficient, complicated operations are required for adhesion, and the adhesion requires a long period of time.

Generally speaking, the adhesiveness of olefin resin compositions to other materials is not satisfactory and, in adhering moldings of an olefin resin composition to articles of other materials, for example, metals, it is necessary to use an adhesive between the articles to be bonded and to apply pressure to bond.

It was also well known that prior art resin compositions as disclosed in, for example, Japanese Pat. Application Publication Nos. 8037/1965 and 28199/71 are useful as materials for electric parts, industrial parts, miscellaneous goods and architectural structures, but they are not satisfactory from the viewpoint of heat accumulation and heat insulation.

As a result of research to develop ethylene resin compositions containing a large amount of inorganic filler, it was found that an ethylene resin composition comprising as main components an ethylene polymer and alumina trihydrate is excellent for a wide variety of applications.

As a result of further investigations on the above ethylene resin composition, it was found that a resin composition which is suitable for use in a wide number of fields could be obtained by varying the proportion of ethylene polymer and alumina trihydrate, incorporating other materials into the resin composition according to the end use need and/or subjecting the resin composition to surface treatments, and that an excellent laminate can be obtained by heat pressing moldings of the above resin composition and articles of metal, e.g., aluminum.

SUMMARY OF THE INVENTION

The object of this invention is, therefore, to provide an ethylene resin composition and moldings prepared therefrom having excellent flexibility, tear strength, toughness, impact strength, resistance to chemicals and electrical arcs, electrical insulating property and non-flammability, as well as improved printing and marking properties on the surfaces of the moldings.

Another object of this invention is to provide a laminate obtained by heat pressing a molding of the ethylene resin composition and articles of aluminum without pretreatment of the moldings of the resin composition.

A further object of this invention is to provide an ethylene resin composition having excellent adhesiveness.

A still further object of this invention is to provide an ethylene resin composition having excellent heat accumulating and heat insulating properties.

In addition to the above features, the ethylene resin composition of this invention is characterized in that the resin composition and moldings prepared from the resin composition evolve a relatively small amount of heat when subjected to combustion but are not flammable at all.

DETAILED DESCRIPTION OF THE INVENTION

The ethylene polymers which can be used in the present invention include both an ethylene homopolymer and a copolymer of ethylene with a component(s) which is/are copolymerizable with ethylene, the copolymer containing at least 80 mol % of ethylene. Examples of the components which are copolymerizable with ethylene and $\alpha$-olefins other than ethylene, e.g., $\alpha$-olefins with 3 to 5 carbon atoms, most practically propylene or butene-1, vinyl compounds of any type which can be copolymerized with ethylene, e.g., vinyl halides such as vinyl chloride, vinylidene halides such as vinylidene chloride, vinyl esters such as the $C_3$ to $C_5$ vinyl esters, most practically vinyl acetate, and saponified substances thereof, e.g., saponified vinyl esters of a degree of saponification of greater than 0 to 98%, most preferably the $C_3$ to $C_5$ vinyl esters such as vinyl acetate.

It is to be understood that in view of the fact that the copolymers used contain at least 80 mol% ethylene the monomer copolymerized with ethylene is not especially limited so long as the essential characteristics of the copolymer meet the guidelines set out below.

Thus, in the specific embodiments which follow it should be understood that while especially preferred monomers copolymerizable with ethylene might be recited, e.g., $\alpha$-olefins such as propylene or butene-1, the specific embodiments include all such comonomers as discussed above unless otherwise indicated.

Generally speaking, the ethylene copolymers illustrate a density lower than the ethylene homopolymers.

The ethylene polymers used in the present invention, be they homopolymers or copolymers, are preferably high density materials, i.e., of a density greater than 0.93.

The most preferred high density polyethylenes and ethylene copolymers used in the present invention have a melt index in the range of from 0.001 to 20 g/10 minutes as determined under a load of 2.16 Kg at a temperature of 190°C, and in particular, ethylene polymers having a density greater than 0.93 g/cc, a molecular weight greater than 100,000 and a melt index in the range of from 0.01 to 10 g/10 minutes as determined under the same conditions as described above are preferred.

There is no overly exact limit on the maximum density of the ethylene homopolymer or copolymer used, but at densities above about 0.96 ease of molding decreases, with this tendency being more pronounced as the density further exceeds this value. Hence, for practical commercial molding operations a preferred density range is about 0.93 to about 0.96.

Ethylene polymers having a high molecular weight and a high density are now produced on an industrial scale using a catalytic system comprising metal oxides as the main components (the so-called Philips method or Standard method) or using a catalytic system comprising transition metal compounds and organometallic compounds (the so-called Ziegler method) and are widely used in various fields.

The ethylene polymers (hereinafter, unless otherwise indicated, this term includes both homopolymers and copolymers of at least 80 mol % ethylene) are blended in an amount of 5 to 70 weight parts with 95 to 30 weight parts of alumina trihydrate having a gibbsite crystal structure as defined below to provide the ethylene resin compositions of the present invention, the alumina trihydrate having a gibbsite crystal structure having an average particle diameter of 100 microns or less.

Alumina hydrates are roughly classified by their crystal structures into the gibbsite type [$\alpha$-Al(OH)$_3$], a bayerite type [$\beta$-Al(OH)$_3$] and a boehmite type [$\alpha$-AlO(OH)] and they are now produced on an industrial scale and widely used.

In the ethylene resin composition of this invention, it is necessary to use alumina trihydrate having a gibbsite crystal structure and at least 0.20 percent by weight of sodium compounds calculated as Na$_2$O fixed in the crystal lattice (in view of the heat decomposition temperature of the alumina hydrates). Alumina trihydrate having a gibbsite crystal structure has a monoclinic crystal system in which the lattice constant is measured as a = 8.62 A, b = 5.06 A and c = 9.70 A, the beta angle is 85°26', and the refractive index is expressed as $\alpha$= 1.568, $\alpha$= 1.568 and $\gamma$= 1.587. The heat decomposition temperature of the above alumina trihydrate is above 160°C. The alumina trihydrate used in the present invention preferably has an average particle diameter of 100 microns or less, more preferably in the range of from 1 to 70 microns.

As described above, the alumina trihydrate should have at least 0.20% by weight of sodium compounds calculated as Na₂O fixed in the crystal lattice of alumina trihydrate since it has been found that alumina trihydrate satisfying the above requirements can intimately be mixed with the ethylene polymer, i.e., it offers a good "compatibility" with the ethylene polymer recited herein. The term good compatibility used herein means that the alumina trihydrate has a high affinity for the ethylene polymer. This results in the increase of toughness properties such as a tear strength, among other mechanical properties, when moldings are produced from the resin composition.

The compatibility of the alumina trihydrate can be determind by taking advantage of the fact that it is easily swollen by organic solvents. More specifically, the compatibility can be determined by allowing the alumina trihydrate to swell and disperse in tetralin for a certain period of time and observing the dispersion state of the alumina trihydrate. In one embodiment, 0.5 g of alumina trihydrate as is used in the present invention is allowed to swell and disperse in 20 cc of tetralin at room temperature and the mixture is placed in a graduated glass test tube followed by being allowed to stand. After 24 hours standing, the degree of swelling is determined by the ratio of the volume of floating swollen alumina trihydrate to the total volume of the mixture. The higher the degree of swelling, the better the compatibility. The above described fixed sodium compounds can be defined as a portion etermined by reducing water-soluble sodium compounds from the total sodium compounds contained in a given alumina trihydrate.

Generally speaking, the alumina trihydrate will have in excess of 0.2% by weight fixed sodium compounds to allow a slight safety factor, but most preferably will contain less than about 5.0% by weight fixed sodium compounds, expressed as Na₂O in both cases.

In the case where a relatively large amount of alumina trihydrate is incorporated into an ethylene polymer as in the resin composition of this invention, it has been found that the alumina trihydrate having fixed sodium compounds less than 0.2% by weight expressed as Na₂O tends to produce white spots on the surface of moldings prepared from the resin composition and the moldings tend to have poor mechanical properties, for example, tear strength and they thereby become brittle.

The present invention will now further be described in greater detail by referring to various embodiments encompassed in the present invention. All of these embodiments fall within the scope of the present invention, but, as the following discussion will make clear, certain highly advantageous effects can be emphasized by appropriately selecting the proportions and particle size of the alumina trihydrate having a gibbsite crystal structure and, in certain cases, by an appropriate selection of the ethylene polymer used. The most advantageous forms of practice of the present invention will now be described. Unless narrower or broader disclosure is provided, in all embodiments below the ethylene polymer is a high density homopolymer or copolymer of at least 80 mol% ethylene having a density of above 0.93, most preferably to about 0.96, and a melt index of 0.001 to 20 (2.16 Kg load at 190°C), and the alumina trihydrate of a gibbsite crystal structure with at least 0.2 by weight of sodium compounds calculated as Na₂O fixed in the crystal lattice has an average particle diameter of 100 microns or less.

1. In the first embodiment, the ethylene resin composition of this invention comprises 60 to 7 parts by weight of an ethylene polymer and 40 to 93 parts by weight of alumina trihydrate of a gibbsite structure. The resin composition can be molded into various shapes by the well known calender molding, injection molding and extrusion molding processes, and is suitable for a wide variety of application, for example, synthetic paper, corrugated cardboard boxes, boards, materials for floors, walls, partitions ceilings and pipes.

Preferred ethylene polymers which can be used for the ethylene resin composition of this particular embodiment are the so-called high density polyethylene polymers having a density greater than 0.93 g/cc, in particular, those having relatively high molecular weight, i.e., greater than 100,000. More specifically, the polyethylene polymers preferably have a high load melt index (under a load of 21.6 Kg at a temperature of 190°C) of 0.01 to 10 g/10 minutes. It is not preferred to use ethylene-vinyl ester copolymers in this emobidment since substantial amounts of vinyl esters, e.g., vinyl acetate, lower the molding properties. Any monomer which does not lower molding properties can, of course, be used in the ethylene copolymer, subject to the 80 mol% ethylene restriction heretofore posed. It should be noted, however, that high density ethylene homopolymer or other ethylene copolymers can successfully be blended with up to 10% ethylene-vinyl ester copolymer, preferably ethylene vinyl acetate.

The alumina trihydrate having a gibbsite crystal structure used in this embodiment preferably has an average particle diameter less than 2 microns. When alumina trihydrate having an average particle diameter greater than 2 microns is used, the final resin compositions are generally not only poor in physical properties such as tear strength and flexibility, but also produce white spots on the surfaces of moldings produced from the resin composition because of secondary aggregates of the alumina trihydrate formed during blending with the ethylene polymer whereby the attractiveness of the moldings is lost. The tendency to lower the above properties increases with increased average particle diameter.

The proportion of the ethylene polymer and alumina trihydrate in this embodiment is 60–7 : 40–93, preferably 50–15 : 50–85, most preferably 40–20 : 60–80 (by weight). If the alumina trihydrate is used in a propotion greater than 93% by weight, the resin composition cannot successfully be molded into various moldings as described above.

The resin compositions of this embodiment can be obtained by any procedures commonly employed in the resin industry, for example, by using a roll mill, a Banbury mixer or a melt extrusion procedure. Alternatively, they can be obtained by dissolving the ethylene polymer in an organic solvent to which the alumina trihydrate has been added and adding an appropriate non-solvent for the ethylene polymer, such as a lower alcohol, to the solution to precipitate the ethylene polymer, thereby producing an intimate mixture of the alumina trihydrate and the ethylene polymer.

The resin composition thus obtained can be molded into various moldings as set forth above. Films or sheets, for example, prepared from the above resin composition are excellent in tear strength and flexibility in spite of the large content of alumina trihydrate. Further, since the resin composition contains a relatively small amount of ethylene polymers, the moldings prepared from the resin composition can be subjected to combustion with only a small amount of black smoke or soot and heat of combustion resulting. The moldings are flame-retarding and have a remarkable resistance to various chemicals.

The above resin composition may contain synthetic resins which can be admixed with the ethylene polymer, such as propylene polymers and elastomers such as ethylene-propylene copolymer rubbers (EPR), ethylene-propylene-diene terpolymers (EPDM), and butadiene-type rubbers, for example, styrene-butadiene rubber (SBR). Also, depending upon the specific applications of the resin composition, various additives such as light stabilizers (for example, ultraviolet rays), oxygen, ozone and heat, flame retardants, plasticizers, reinforcing agents as well as fillers, coloring agents, antistatic agent, antiblocking agents, decomposition accelerators and the like can be added thereto. These compositions are also included within the scope of this invention. In particular, inorganic salts such as aluminum chloride, aluminum sulfate and the like, phosphoric acid compounds such as calcium metaphosphate and the like, and metal salts of higher aliphatic acids such as barium stearate, calcium stearate, magnesium stearate, aluminum stearate, cadmium stearate, zinc stearate and the like can be added to the resin composition in a proportion of from 0.1 to 5 parts by weight per 100 parts by weight of the resin composition comprising ethylene polymer and aluminum trihydrate so as to render the alumina trihydrate hydrophilic.

When the resin composition is molded into films, sheets, boards, pipes, rods and the like by a calendering, extruding or injection molding process as previously described, it is preferred to conduct the molding at a temperature below about 220°C.

Generally speaking, any molding used to process the ethylene resin of this invention will be conducted at a temperature above the softening point of the resin components but below the decomposition point of the resin components or the alumina trihydrate (alumina trihydrate generally shows substantial decomposition in the area of 220° – 230°C). Other than this factor, other conditions are not overly critical and can be selected in accordance with art recognized techniques.

The moldings prepared by the above conventional procedures can be subjected to a surface treatment with an aqueous solution of sodium aluminate having a concentration of 5 to 20% by weight at a temperature of 20° to 98°C to improve the marking and printing properties of the surface. In this connection, an aqueous solution of sodium aluminate having a concentration greater than about 20% by weight is very difficult to obtain because of the solubility of sodium aluminate in water. Also, the aqueous solution of sodium aluminate may contain an excess amount of sodium hydroxide.

The moldings of the resin composition which have been treated with an aqueous solution of sodium aluminate are excellent in surface whiteness, printing and marking properties as well as mechanical properties such as flexibility, tear strength and abrasion resistance. They are also flame-retarding and have excellent electric properties, such as resistance to arcs, and antistatic properties.

2. In the second embodiment, the ethylene resin composition of this invention comprises 70 to 5 parts by weight of an ethylene polymer, 30 to 95 parts by weight of alumina trihydrate and 0.1 to 15 parts by weight of one or more unsaturated carboxylic acids based on 100 parts by weight of the ethylene polymer and the alumina trihydrate. Such a resin composition is particularly excellent in adhesiveness.

Suitable ethylene polymers which can be used for the ethylene resin composition of this embodiment include an ethylene homopolymer, a copolymer of at least 80 mol% of ethylene and less than 20 mol% of an α-olefin, for example, propylene or butene-1, and a copolymer of ethylene as a main component (at least 80 mol%) and a vinyl compound. Particularly preferred ethylene polymers are high density polyethylenes having a melt index in the range of from 0.001 to 20 g/10 minutes under a load of 2.16 Kg at a temperature of 190°C or a copolymer of the above high density polyethylene and less than 10% by weight of an α-olefin other than ethylene.

The alumina trihydrate having a gibbsite crystal structure used in this embodiment preferably has an average particle diameter less than 100 microns, most preferably from 5 to 70 microns.

The proportion of the ethylene polymer in the resin composition can vary from 5 to 70 parts by weight and is preferably from 20 to 50 parts by weight based on 100 parts by weight of the resin composition comprising the ethylene polymer and the alumina trihydrate. That is, the alumina trihydrate is used in a proportion of from 95 to 30 parts, preferably 80 to 50 parts, by weight. When the ethylene polymer is used in a proportion less than 5 parts by weight, the resulting resin composition is generally difficult to mold into various moldings or it is difficult to obtain moldings having a uniform composition. When the ethylene polymer is used in a proportion greater than 70 parts by weight, moldings prepared from the resulting resin composition generally exhibit poor adhesiveness to articles prepared from other materials, for example, metals.

The unsaturated carboxylic acids which can be used in the resin composition of this embodiment include aliphatic unsaturated carboxylic acids, aromatic unsaturated carboxylic acids and alicyclic unsaturated carboxylic acids or derivatives thereof. There is no particular limitation on the unsaturated carboxylic acid or acids used, and both solid and liquid acids can be used, as can be derivatives. It is, however, essential that the —COOH moiety is such acids be retained. Preferred unsaturated carboxylic acids are fumaric acid, maleic acid, acrylic acid, methacrylic acid, itaconic acid, crotonic acid, oleic acid, cinnamic acid and the like.

The above unsaturated carboxylic acids can be used in a proportion of from 0.1 to 15 parts by weight, preferably from 0.1 to 10 parts by weight, based on 100 parts by weight of the resin composition comprising an ethylene polymer and aluminum trihydrate. When the unsaturated carboxylic acid is used in a proportion less than 0.1 parts by weight, the resulting resin generally exhibits poor adhesiveness or does not have a uniform adhesive effect. When the unsaturated carboxylic acid is used in a proportion greater than 15 parts by weight, the resin composition still retains a satisfactory adhesiveness but exhibits no additional increase in adhesiveness as compared with a resin composition containing 15 parts by weight of unsaturated carboxylic acid. Rather, the use of unsaturated carboxylic acids in a proportion greater than 15 parts by weight sometimes deteriorates certain physical properties of the resin composition, for example, rigidity and heat resistance.

The resin composition of this embodiment can be obtained by mixing the ethylene polymer and either of the alumina trihydrate or the unsaturated carboxylic acid(s) and then adding the reminder to the resulting mixture. Alternatively, the ethylene polymer, alumina trihydrate and unsaturated carboxylic acid(s) can be mixed simultaneously. The mixing can be effected mechanically as described previously using the well known roll mill, Banbury mixer or melt extrusion procedure.

The ethylene resin composition thus obtained can be molded into various moldings such as films, boards, sheets, pipes, rods or other shapes by calendar molding, injection molding or extrusion molding.

The resin compositions of this embodiment are excellent in mechanical properties such as impact strength and flexibility in spite of the large content of alumina trihydrate and they are also flame-retarding. Further, since the resin composition contains a relatively small amount of ethylene polymers, the moldings prepared from the resin compositions can be subjected to combustion with a small amount of black smoke or soot and heat of combustion being generated. In addition, the resin compositions described in this embodiment exhibit excellent adhesiveness and, therefore, the moldings prepared from the resin compositions can easily be bonded by heat pressing to other articles prepared from such materials as metals, for example, aluminum, iron, copper, tin and the like or alloys thereof such as brass, cellulosic materials, for example, paper, fiber, wood and the like, and inorganic materials such as stone, gypsum plaster, cement and the like. Alternatively, the resin composition described in this embodiment can be used as an adhesive for bonding moldings prepared from the above materials by spreading a powder of the resin composition between the moldings and other articles to be bonded followed by heat pressing. The shapes of articles to be bonded to the moldings include films, sheets, foils, textiles, boards, pipes, powders, rods and the like.

The resin composition can be composed of ethylene resin, alumina trihydrate and unsaturated carboxylic acid, but, for particular applications, be blended with different types of synthetic resins such as other olefinic resins, for example, polyethylene having a low density, propylene and the like and elastomers, for example, an ethylene-propylene copolymer rubber (EPR), an ethylene-propylene-diene terpolymer (EPDM), butadiene type rubbers, for example, styrene-butadiene copolymers (SBR) and chlorinated polyolefins, for example, chlorinated polyethylene. Also, depending upon the specific applications of the composition, various additives such as light stabilizers (for example, ultraviolet rays), oxygen and ozone, flame retardants, metal corrosion inhibitors, reinforcing agents, plasticizers as well as fillers, coloring agents, antistatic agents, decomposition accelerators, additives for improving electric properties and foaming agents can be added thereto. These compositions are also included within the scope of this invention.

The ethylene resin compositions in this embodiment are excellent in various properties, in particular, flame-retardance and adhesiveness and, therefore, moldings having various shapes prepared from the resin compositions are useful in a wide variety of applications by bonding to articles of metals, stone, plaster and the like. Examples of the bonded articles include structure materials such as floors, walls, partitions, ceilings and the like, and pipes.

3. In the third embodiment, the ethylene resin composition of this invention comprises 40 to 5 parts by weight of an ethylene polymer, 60 to 95 parts by weight of alumina trihydrate and 5 to 15 parts by weight, based on 100 parts by weight of the ethylene polymer and alumina trihydrate, of one or more high molecular weight organic substances having a softening point below room temperature. The resin compositions of this embodiment are excellent particularly in flexibility and flame-retarding property.

Suitable ethylene polymers which can be used for the ethylene resin composition of this embodiment include an ethylene homopolymer, a copolymer of at least 80 mol% of ethylene and less than 20 mol% of an $\alpha$-olefin, for example, propylene or butene-1, and a copolymer of ethylene as a main component (at least 80 mol%) and a vinyl compound. Particularly, preferred ethylene polymers are high density polyethylene having a melt index in the range of from 0.001 to 20 g/10 minutes under a load of 2.16 Kg at a temperature of 190°C or a copolymer of the above high density polyethylene and less than 10% by weight of an $\alpha$-olefin other than ethylene. It is not preferred to use ethylene-vinyl ester copolymers in this embodiment since substantial amounts of vinyl esters, e.g., vinyl acetate, lower the molding properties. Any monomer which does not lower molding properties can, of course, be used in the ethylene copolymer, subject to the 80 mol% ethylene restriction heretofore posed. It should be noted, however, that high density ethylene homopolymer or other ethylene copolymers can successfully be blended with up to 10% ethylene-vinyl ester copolymer, preferably ethylene vinyl acetate.

The alumina trihydrate having a gibbsite crystal structure used in this embodiment has an average particle diameter in the range of from 1 to 100 microns, preferably from 5 – 70 microns.

The proportion of the ethylene polymer in the resin composition can vary from 40 to 5 parts by weight and is preferably from 40 to 10 parts by weight based on 100 parts by weight of the resin composition comprising the ethylene polymer and the alumina trihydrate. That is, alumina trihydrate is used in a proportion of from 60 to 95 parts, preferably from 60 to 90 parts by weight. When the alumina trihydrate is used in a proportion less than 60 parts by weight, the resulting resin composition is generally easily flammable and undesirably evolves a relatively large amount of black smoke (soot) and has a high heat of combustion when moldings prepared from the resin composition are subjected to combustion. When the alumina trihydrate is used in a proportion greater than 95 parts by weight the resin composition is difficult to mold into various moldings or it is extremely difficult to obtain moldings having a uniform composition.

The high molelcular weight organic substances having a softening point below room temperature used in the resin composition of this embodiment have a molecular weight of at least 10,000, and are preferably those which do not escape from the resin composition during the molding at a high temperature. Examples of the high molecular weight organic substances are atactic polypropylene (by-products obtained in the production on crystalline polypropylene, soluble in boiling n-hexane), butadienecontaining rubbers such as those obtainable by emulsion polymerization, for example, polybutadiene rubbers, styrene-butadiene rubbers (SBR), acrylonitrile-butadiene rubbers (NBR) and the like, and non-vulcanized rubbers such as polychloroprene rubber, butadiene homopolymer rubber or styrene-butadiene block or random copolymer rubbers obtainable by solution polymerization, ethylenepropylene copolymer rubbers (EPR), ethylene-propylene-diene terpolymer rubbers (EPT), isobutyl rubbers (butyl rubbers), polyisoprene rubbers, rubbers comprising mainly alkylene oxides and epihalohydrins or comprising mainly epihalohydrins, chlorinated polyolefins (for example, chlorinated polyethylene), chlorosulfonated polyethylenes and the like.

It shall be understood that there is no particular limitation on the high molecular weight organic substance used so long it has a molecular weight above 10,000 and has a softening point below room temperature (approximately 20°C). These materials can generally be described as thermoplastic (noncrosslinked) and illustrating cold flow at room temperature. Obvious restriction will, of course, be apparent to on skilled in the art, e.g., the materials shold not evaporate or degrade when molded, but these are obvious processing limitations easily recognized by one skilled in the art.

As previously set forth, the high molecular weight organic substances recited above can be incorporated in a proportion of from 5 to 15 parts by weight based on 100 parts by weight of the composition comprising an ethylene polymer and the alumina trihydrate. When the high molecular weight organic substance is used in a proportion less than 5 parts by weight, the moldings obtained from the resin composition do not show any improved flexibility while, on the other hand, when the organic substance is used in a proportion greater than 15 parts by weight, the ability of a molding to retain its molded shape is extremely lowered in molding the resin composition at a temperature above the melting point of the ethylene polymer, generally at a temperature in the range of from 180° to 400°C, more specifically from 200° to 300°C.

The ethylene resin composition of this embodiment can be obtained by mixing the ethylene polymer with either of the alumina trihydrate or the high molecular weight organic substance having a softening point below room temperature and then adding the remaining component to the resulting mixture. Alternatively, the ethylene polymer, alumina trihydrate and the high molecular weight organic substance can be mixed simultaneously. The mixing can be effected mechanically as previously described by using the well known roll mill, Banbury mixer or melt extrusion procedures.

The ethylene resin composition thus obtained can be molded into various moldings such as films, boards, sheets, pipes, rods or other shapes by calendar molding, injection molding or extrusion molding. However, the final molding process in the above molding procedures is advantageously carried out at a temperature in the range of from 180° to 400°C, preferably from 200° to 300°C.

The resin compositions of this embodiment are excellent in mechanical properties such as impact strength and flexibility in spite of the large content of alumina trihydrate and also they are flame-retarding. Further, sine the resin composition contains a relatively small amount of ethylene polymer, the moldings prepared from the resin compositions can be subjected to combustion with small amounts of black smoke or soot and heat of combustion being generated.

The moldings obtained from the ethylene resin composition of this embodiment can be bonded to other articles prepared from materials such as metals, for example, aluminum, iron, copper, tin and the like or alloys thereof such as brass and stainless steel, cellulosic materials, for example, paper, fiber, wood and the like, and inorganic materials such as stone, gypsum plaster, cement etc., by using an appropriate adhesive between the moldings and the articles to be boned thereto or by incorporating into the resin composition one or more unsaturated carboxylic acids having an adhesive property as previously described in detail. Suitable shapes of articles to be bonded to the moldings of the resin composition are films, sheets, foils, textiles, boards, pipes, powders, rods and the like.

Although the resin composition of this embodiment can be used as a composition comprising an ethylene resin, alumina trihydrate and one or more high molecular weight organic substances having a softening agent below room temperature, it can effectively be used as a blend with other synthetic resins, depending upon the specific utility of the articles prepared from the resin composition. Further, additives commonly used in olefinic resins such as light stabilizers (ultraviolet rays), oxygen, ozone and heat, flame retardants, copper inhibitors, reinforcing agents, plasticizers and other fillers, coloring agents, coloring improving agents, antistatic agents, decomposition accelerators and electrical property improving agents can be incorporated into the resin composition. Such blends are also encompassed within the scope of this invention.

The ethylene resin compositions thus obtained are excellent in flame-retardance and flexibility as described above, and can be used in a wide variety of utilities by molding into various shapes. Examples of the utility of the resin composition are sheets, boards or composites thereof for exterior materials in the architectural field, materials for automobiles and ships and industrial materials.

4. The fourth embodiment of the resin composition of this invention relates to an ethylene resin composition which finds particular use in providing a superior laminate with an article(s) of aluminum, which can be obtained by heat pressing a molding prepared from the ethylene resin composition and an article of aluminum. Since this embodiment finds such particular application in such a laminate, the following discussion will be in terms of such a laminate, though the present invention is not limited thereto and includes the resin per se. The ethylene resin composition useful for this purpose comprise 20 to 5 parts by weight of an ethylene polymer and 80 to 95 parts by weight of alumina trihydrate having a gibbsite crystal structure.

The laminate using the resin composition of this invention can be prepared merely by heat pressing the molding and an article to be bonded, and it is not necessary to use any separately prepared adhesives, nor is it necessary to subject the resin moldings to a pretreatment such as ionization by γ-rays, a corona discharge, an ozone oxidation, a high temperature heat treatment or a chemical treatment with maleic anhydride.

In this embodiment, strong adhesion can be obtained by merely heat pressing a molding of the resin composition and an article of aluminum without using adhesives. Although it is not clear whether an ethylene resin composition containing other types of alumina hydrate, e.g., a boehmite type alumina hydrate, also has the same degree of adhesive property, it is considered that the excellent adhesiveness of the resin composition is due to eutectic melting of the aluminum metal and alumina trihydrate having a gibbsite crystal structure.

The ethylene polymers useful for the resin composition of this embodiment include a high, medium or low density ethylene homopolymer, an ethylene-vinyl ester copolymer and a saponified copolymer of ethylene-vinyl ester, where in both substances the vinyl ester is most preferably vinyl acetate (at least 80 mols% ethylene). However, an ethylene polymer having a high melting point is not preferred since it requires a relatively high temperature for molding, and alumina trihydrate having a gibbsite crystal structure tends to degrade (decomposition of condensation water) at relatively high temperatures. In preparing the resin composition of this embodiment, a polyethylene having a high density and a high molecular weight and a copolymer comprising ethylene as the main component are preferred.

The terms low, medium and high density ethylene polymers include materials having a density of about 0.90 to about 0.98, and all of such are useful in the present embodiment. However, most preferred are those materials falling within the general guidelines heretofore provided, i.e., of a density of greater than 0.93 to about 0.96.

The alumina trihydrate having a gibbsite crystal structure used in this embodiment preferably has an average particle diameter of from 0.1 to 100 microns, more preferably greater than 1 micron. Alumina trihydrate having an average particle diameter less than 0.1 micron has a strong affinity for the ethylene polymer and generally lacks adhesive capability to aluminum.

In this resin composition, the ethylene polymer and the alumina trihydrate are generally used in a weight ratio of 20–5 : 80–95. When the alumina trihydrate is used in a proportion less than 80% by weight, the adhesiveness of the resulting resin composition is low and when the alumina trihydrate is used in a proportion greater than 95% by weight, the resin composition is difficult to mold, and, even if the molding can be conducted, moldings having uniform composition cannot easily be obtained.

The resin composition of this embodiment can be prepared by a mechanical process using a roll mill, a Banbury mixer or a melt extruder or by a process comprising dissolving the ethylene polymer in an organic solvent to which alumina trihydrate has been added and adding a non-solvent such as a lower alcohol to the solution, thereby precipitating the ethylene polymer, to give an intimate mixture of the ethylene polymer and the alumina trihydrate.

The ethylene polymer used in this resin composition can be in combination with components which are miscible therewith, e.g., a mixture of polyethylene and polypropylene or a blend of elastomers such as ethylene-propylene copolymer rubbers (EPR), ethylene-propylene-diene terpolymer rubbers (EPDM), polybutadiene rubbers, styrene-butadiene copolymer rubbers (SBR) and chlorinated or chlorosulfonated polyolefin rubbers and the like.

Further, the ethylene resin composition may contain various additives such as light stabilizers (ultraviolet rays), ozone, oxygen and heat, flame retardants, plasticizers, reinforcing agents, other fillers, coloring agents, coloring improving agents, antistatic agents, decomposition accelerating agents and adhesion improving agents. It is to be noted that such compositions are also included within the scope of this invention.

The resin composition can be molded into various moldings such as films, sheets, boards, pipes, rods and the like by a calendar molding, an extrusion molding, a heat-press molding or an injection molding process as described above, but it is preferred to conduct such molding at a temperature below the decomposition temperature of alumina trihydrate (at 220°C).

The articles of aluminum to be bonded to the moldings of the resin composition include an aluminum foil, an aluminum plate and the like.

The bonded articles can be obtained by heat pressing a clean article of aluminum contacted on one or both surfaces with the moldings of the resin composition.

It is preferred to use a heat roll or a heat press roll for the heat pressing. Application of pressure serves to increase the adhesive strength and to ensure uniform bonding. Generally, a pressure in the range of 1 to 100 Kg/cm$^2$ is sufficient. The temperature which can be used in the heat pressing should be above the melting or softening point of the ethylene polymer contained in the resin composition to be bonded.

It is preferred to use a temperature considerably higher than the melting or softening point since temperatures slightly higher than the above point sometimes result in an insufficient adhesion effect and poor uniformity of adhesion. Further, at low temperatures, it is necessary to increase the pressure and the time for heat pressing in order to enhance the adhesion effect. However, the heat pressing should be conducted below the decomposition temperature of the alumina trihydrate since the moisture liberated by the decomposition often reduces the adhesion effect. It will be apparent to one skilled in the art that the heat pressing must be conducted below the temperature at which the ethylene polymer deforms or deteriorates.

The time required for the heat pressing varies depending upon the type of the ethylene polymer, proportions of the ethylene polymer and alumina trihydrate and the temperature and pressure applied in the heat pressing, but is generally in the range of from 1 to 10 minutes.

In this embodiment, effective adhesion can generally be obtained by merely heat pressing the articles to be bonded, but when a very strong adhesion is required, an improved adhesion can be obtained by placing between the articles to be bonded a composition comprising an ethylene-vinyl acetate copolymer, an unsaturated carboxylic acid and an organic peroxide or a molding of the above composition, or previously incorporating a compound capable of improving the adhesiveness into the ethylene resin composition.

In the case of adhering a molding(s) of the resin composition and an article of aluminum according to this embodiment, the adhesion step can easily be carried out because the ethylene resin composition exhibits excellent adhesion and is free from unpleasant odor.

Also, the adhesion can be carried out without any pretreatment such as exposure to ionizing radiation, corona discharge, ozone oxidation or high temperature heating of the resin composition or the moldings of the resin composition, whereby any deterioration which may be associated such pretreatments can be avoided. Further, the resin composition described herein has little tendency to corrode aluminum and makes it unnecessary to use specific adhesives.

The most significant advantage, of course, is that a sufficient adhesive effect can be obtained by merely heat pressing the articles to be bonded.

The articles of the ethylene resin compositions used in this embodiment are excellent in heat resistance, flame retardance, heat insulating and anticorrosive properties, and are produced at low cost, and aluminum is excellent in mechanical properties such as impact strength and rigidity. The bonded laminates obtained in this embodiment therefore possess the advantages of both materials. In addition, it is possible to produce laminates having various shapes, i.e., from a thin laminate composed of a film of the resin composition and an aluminum foil to a thick laminate composed of a board of the resin composition and an aluminum plate, as well as a rod or a pipe.

The laminates obtained in this embodiment are useful in a wide variety of applications since they possess the various advantages described above and can be molded into various shapes. For example, they are useful as parts for transportation facilities such as automobiles, ships and the like, as well as structural materials for walls, ceilings and floors.

5. The fifth embodiment of this invention is an ethylene resin composition having an excellent heat accumulating and heat insulation capability. The ethylene resin composition used in this embodiment comprises 7.5 to 50 parts by weight of a resin mixture containing 0 to 94% by weight of an ethylene polymer and 100 to 6% by weight of an ethylene-vinyl acetate copolymer and 92.5 to 50 parts by weight of alumina trihydrate having a gibbsite structure. However, the resin mixture used in this embodiment preferably comprises 10 to 94% by weight of the ethylene polymer and 90 to 6% by weight of the ethylene-vinyl acetate copolymer. Further, the above physical properties can be enhanced by optionally using an alumina trihydrate consisting of 80 to 99.5% by weight of alumina trihydrate and 20 to 0.5% by weight of metal oxides.

The requirements necessary for such heat accumulating and heat insulating resin compositions are, in addition to the general mechanical properties, that the resin composition be free from deformation by heat even if exposed to heat for a long period of time, be excellent in heat resistance and flameretardance property, it does not generate any toxic substances due to chemical degradation over long periods of time and be inexpensive. More important requirements are that moldings of the resin composition do not evolve high heat of combustion and a large amount of black smoke or soot upon combustion of the moldings.

It will be apparent that in producing heat accumulating and heat insulating resin compositions a large amount of inorganic filler relative to ethylene polymer is preferably used. However, this cannot easily be accomplished and even if a large amount of inorganic filler could be incorporated into the ethylene polymer it is extremely difficult to obtain a resin composition having a uniform composition and to mold such a composition into the desired shape.

The resin composition of this embodiment generally satisfies the above requirements, i.e., it is not easily deformed by heat and is excellent in heat resistance. In addition, the moldings prepared from the resin composition evolve a relatively small amont of black smoke upon combustion after use and are not flammable at all.

The ethylene polymers used in the resin composition of this embodiment include an ethylene homopolymer, a copolymer of at least 80 mol% of ethylene and less than 20 mol% of an α-olefin other than ethylene, for example, propylene, butene-1 and the like, and a copolymer of ethylene as a main component and a small proportion of one or more vinyl compounds, e.g., an ethylene-vinyl acetate copolymer of at least 80 mol% ethylene and at most 20 mol% vinyl acetate, having a density greater than 0.93 and a melt index of from 0.001 to 20 g/10 minutes (2.16 Kg at 190°C). In particular, a high density polyethylene having a melt index of from 0.001 to 20 g/10 minutes as determined under a load of 2.16 Kg at a temperature of 190°C and the above specified high density polyethylene containing less than 10 mol% of α-olefins other than ethylene are preferably used. The ethylene-vinyl acetate copolymers used in this embodiment may contain from less than 30%, usually 2 to 30% and more generally less than 20% by weight of vinyl acetate and are commercially available. In particular, an ethylene-vinyl acetate copolymer having a density of 0.93 or less and a melt index of from 0.1 to 20 g/10 minutes (0.16 Kg at 190°C) is preferred.

The resin component of the resin composition comprises 100 to 6%, preferably 90 to 6%, by weight of one or more ethylene-vinyl copolymers and 0 to 94%, preferably 10 to 94%, by weight of one or more ethylene polymers. When the above copolymer is used in a proportion less than 6.0% by weight, it is difficult to obtain a uniform resin composition by blending the inorganic materials (alumina trihydrate, optional metal oxides). Also, a resin composition containing more than 6.0% by weight of ethylene-vinyl acetate copolymer increases the adhesion of the moldings prepared from the resin composition to a metal plate such as an aluminum or iron plate as described hereinafter in greater detail.

The alumina trihydrate having a gibbsite crystal structure used in the resin composition of this embodiment preferably has an average particle diameter in the range of from 1 to 100 microns, more preferably in the range of from 5 to 70 microns.

The metal oxides which are optionally used in the resin composition include oxides of metals such as calcium, magnesium, aluminum, titanium, silicon, iron and chromium. Particularly preferred metal oxides are aluminum oxide (alumina), titanium dioxide, silicon oxide (silica), calcium oxide, magnesium oxide (magnesia) and chromium oxide.

The particle size of the metal oxides is not overly important so long as it does not interfere with molding or adversely affect resin properties. Generally, the metal oxides are less than 200 microns in average particle diameter, more preferably less than 10 microns.

It is preferred that the inorganic filler(s) (alumina trihydrate plus metal oxide) comprises 20 to 0.5% by weight metal oxide and 80 to 99.5% by weight alumina trihydrate having a gibbsite crystal structure. When the metal oxide is less than 0.5% by weight the resulting resin composition has a low heat insulating or accumulating effect, on the other hand, when the metal oxide is greater than 20% by weight, no additional advantages are obtained as compared with inorganic fillers containing 20% by weight metal oxide.

The resin composition of this embodiment generally comprises 50 to 7.5 parts by weight of the ethylene polymer and 50 to 92.5 parts by weight of the inorganic filler, preferably 40 to 10 parts by weight of the ethylene polymer and 60 to 90 parts by weight of the inorganic filler. When the inorganic filler is used in a proportion of less than 50 parts by weight, the resulting resin composition is flammable and the moldings prepared therefrom evolve a large amount of black smoke (soot) and heat of combustion. At a proportion higher than 92.5 parts by weight of the inorganic filler, the resulting resin composition cannot effectively be molded into various moldings and, even if the moldings can be made, it is difficult to obtain moldings having a uniform composition.

The ethylene resin composition of this embodiment can be prepared by first mixing either two or three of the components (ethylene polymer, ethylene-vinyl acetate copolymer, alumina trihydrate and metal oxide) and adding the remaining component(s) or alternatively by mixing the above all components at the same time. The mixing can be conducted mechanically as previously described using a roll mill, a Banbury mixer or a melt extrusion procedure.

The resin composition thus obtained can be molded into various shapes such as films, boards, sheets, pipes, rods and the like by well known procedures, for example, a calendar molding, an injection molding and an extrusion molding at a temperature of from 180° to 400°C, preferably from 200° to 300°C.

The resin compositions obtained in accordance with this embodiment are excellent in mechanical properties such as impact strength and flexibility, in spite of the large content of alumina trihydrate. Also, the resin compositions exhibit excellent heat accumulation and flame-retarding properties. Further, since the resin compositions contain a small proportion of ethylene polymer, they evolve a relatively small amount of black smoke (soot) and heat of combustion upon combustion of moldings obtained from the resin compositions.

The moldings obtained from the resin composition can be bonded to various other articles prepared from metals such as aluminum, iron, copper, tin and the like or alloys thereof, for example, brass or stainless steel, cellulosic materials such as paper, fiber and wood and inorganic materials such a stone, gypsum plaster and cement by placing an adhesive material between the moldings and the articles to be bonded or by previously incorporating an unsaturated carboxylic acid and an organic peroxide into the resin composition.

The unsaturated carboxylic acids useful for this purpose include both liquid and solid unsaturated carboxylic acids. Examples of the liquid acids include acrylic acid, methacrylic acid, 2-methylene glutaric acid monomethyl ester and the like, and examples of the solid acids include crotonic acid, maleic acid, fumaric acid, itaconic acid, 2-methylene glutaric acid, citraconic acid and the like.

These unsaturated carboxylic acid can be used in a proportion of from 0.1 to 4.0 parts by weight based on 100 parts by weight of the ethylene resin composition whereby the adhesiveness can be improved to a certain extent.

A further improvement in adhesiveness can be obtained by incorporating, in addition to the unsaturated carboxylic acid, an organic peroxide into the resin in a proportion of from 0.01 to 0.2 parts based on 100 parts by weight of the resin composition. Alternatively, strong adhesion can also be obtained by applying an unsaturated carboxylic acid to the surface of the molding of the resin composition in an amount of from 1 to 2 mg/cm² and heat pressing the other article to the surface, but strongest adhesion can generally be obtained by incorporating an unsaturated carboxylic acid together with an organic peroxide in the proportions recited above.

The organic peroxides useful for this purpose include ketone peroxides such as 1,1-bis-tert-butylperoxy-3,3,5-trimethylcyclohexane, hydroperoxides such as 2,5-dimethylhexane-2,5-dihydroperoxide, dialkyl peroxides such as dicumylperoxide, diacylperoxides such as benzoylperoxide and peroxyesters such as 2,5-dimethyl-2,5-dibenzoylperoxyhexane.

The heat pressing described above can generally be effected at a temperature in the range of from 140° to 180°C by pressing the moldings and articles to be bonded under low pressure for a period of from 2 to 10 minutes. The articles to be bonded to the moldings of the resin composition can be in various shapes such as films, sheets, foils, textiles, powders, boards, pipes, rods and the like.

Although the ethylene resin composition can be composed of an ethylene polymer, an ethylene-vinyl acetate copolymer, alumina trihydrate and, optionally, a metal oxide, it can also be blended with other synthetic resins depending upon the specific utility. Further, various additives commonly used in the resin compositions such as light stabilizers (ultraviolet rays), oxygen, ozone and heat, flame retardants, metal deterioration inhibitors, for example, copper inhibitors, reinforcing agents, other fillers, plasticizers, coloring agents, coloring improving agents, antistatic agents, decomposition accelerators and electrical property improving agents and the like can also be added thereto. It is to be noted that such blends are also within the scope of this invention.

The ethylene resin compositions of this embodiment can be used in a wide variety of applications in various molded shapes since they possess excellent properties as described above, in particular, flame retardance and heat accumulation capability, as well as excellent flexibility. For example, they can be used as exterior materials in structures, materials for automobiles and ships and industrial materials in the form of sheets, boards or a composite material thereof.

The present invention will now be further illustrated by the following examples, but they are not to be construed as limiting the present invention.

In the examples, various physical and chemical properties were determined by the following methods.

1. Torsional rigidity was determined based on the Japanese Industrial Standards (hereinafter JIS) K 6745 at a temperature of 20°C.

2. Izod impact strength was determined based on ASTM D-256 at a temperature of 20°C.

3. Tear strength was determined based on JIS P 8116 at a temperature of 20°C.

4. Heat of combustion was determined based on JIS K 2279.

5. Arc resistance was determined based on JIS K 6911.

6. Flame retardance was determined based on ASTM D 2863-70 in terms of oxygen index.

7. Thermal conductivity which indicates the heat insulating and heat accumulating properties, was determined based on JIS A 1412.

8. Heat insulating property was determined by heating a test piece of the heat accumulating and heat insulating composite plate having the dimensions of 30 cm length, 30 cm width and 1 cm thickness in a thermostatically controlled container maintained at a temperature of 60° ± 1°C, and, after the temperature of the plate reached 60° ± 1°C, placing the plate in an environment kept at 23° ± 1°C and measuring the surface temperature of the plate at constant intervals.

9. Surface condition of the moldings was rated by observing the presence or absence of secondary aggregates (appearing as white spots) due to poor dispersibility of fillers in the moldings. When the surface of the moldings presented uniform glossy whiteness, it is referred to as a good surface condition.

10. Acid resistance was determined by immersing a test piece of a molded sheet in a 20% aqueous solution of hydrochloric acid for 10 hours for etching and, after washing the test piece thus treated with water, measuring the tear strength of the test piece according to the tear strength determination test described in 3. above. The acid resistance is indicated in terms of percent decrease in the tear strength in the HCl etched test piece as compared with the tear strength of an untreated molded sheet.

11. Cloud point was determined based on JIS K 6714.
12. Gloss was determined based on JIS Z 8741.
13. Marking and printing properties were determined by comparing the markability of the test piece with that of cellulose papers, and also by dropping water droplets on the surface and observing the tendency of water droplets to combine.
14. Electrostatic charging was determined by applying a voltage of 10 KV for 3 seconds to a test piece to charge the test piece and recording the time required for the electrostatic charge to decrease to one-half of the initial charge.
15. Adhesive strength was determined based on ASTM D 903-49 by measuring the peel strength at the angle of 180° at a peeling rate of 100 mm/minute at a temperature of 20°C using an Instron type tensile tester.

EXAMPLE 1

30 parts by weight of an ethylene-butene-1 copolymer having a high melt index of 5.2 g/10 minutes as measured under a load of 21.6 Kg at a temperature of 190°C and a density of 0.95 g/cc (manufactured by the Japan Olefin Chemical Company under the trade name "Sholex") and 70 parts by weight of alumina trihydrate powder having a gibbsite crystal structure and an average particle size of from 0.5 to 2 microns (manufactured by Showa Denko K.K. under the trade name "Higilite") (bulk density, 1.24 g/cc; fixed sodium compound (water insoluble), 0.36% as $Na_2O$; total sodium compounds (water soluble and insoluble), 0.5%; water soluble sodium compounds, 0.14% all based on total aluminum trihydrate weight; degree of swelling, 0.37 cc/cc as determined by the procedure described previously, hereinafter alumina trihydrate of the same chemical composition was used, though particle size (and, of course, bulk density) occasionally varied, unless otherwise indicated) were mixed in a mixing kneader for about 10 minutes at a temperature of 160° and 170°C. The resulting mixture was immediately supplied to a calender roll maintained at a temperature of 135° ± 5°C to form a sheet having a thickness of about 0.6 mm and the sheet was then passed through a second calender roll maintained at room temperature to form a sheet having a thickness of about 0.5 mm. The sheet thus prepared showed a good surface condition (uniform and glossy) and had the following properties:

| | |
|---|---|
| Torsional Rigidity: | $32.5 \times 10^3$ kg/cm$^2$ (longitudinal direction), $22.1 \times 10^3$ kg/cm$^2$ (lateral direction) |
| Tear Strength: | 64.7 kg/cm (longitudinal direction) 33.5 kg/cm (lateral direction) |
| Heat of Combustion: | 3310 Kcal/kg |
| Oxygen Index: | 31.3 (flame-retarding) |
| Acid Resistance: | 0% (in both longitudinal and lateral directions) |
| Arc Resistance: | 187 seconds |

EXAMPLE 2

A sheet was prepared in the same manner as described in Example 1 but using 15 parts by weight of the ethylene-butene-1 copolymer and 85 parts by weight of alumina trihydrate. The resulting sheet was found to have a good surface condition and had the following properties:

| | |
|---|---|
| Torsional Rigidity: | $29.3 \times 10^3$ kg/cm$^2$ (longitudinal direction), $18.6 \times 10^3$ kg/cm$^2$ (lateral direction) |
| Tear Strength: | 63.2 kg/cm (longitudinal direction) 32.3 kg/cm (lateral direction) |
| Heat of Combustion: | 1650 Kcal/kg |
| Oxygen Index: | 33.9 (flame-retarding) |
| Acid Resistance: | 0% (in both longitudinal and lateral) directions) |
| Arc Resistance: | 250 seconds |

COMPARATIVE EXAMPLE 1

A sheet was prepared in the same manner as described in Example 1 but using 70 parts by weight of the ethylene-butene-1 copolymer and 30 parts by weight of alumina trihydrate. The resulting sheet was found to have a good surface condition and had the following properties:

| | |
|---|---|
| Torsional Rigidity: | $33.9 \times 10^2$ kg/cm$^2$ (longitudinal direction), $31.8 \times 10^2$ kg/cm$^2$ (lateral direction) |
| Tear Strength: | 32.5 kg/cm (longitudinal direction) 29.1 kg/cm (lateral direction) |
| Heat of Combustion: | 7730 Kcal/kg |
| Oxygen Index: | 23.1 (easily flammable) |
| Acid Resistance: | 0% (in both longitudinal and lateral directions) |
| Arc Resistance: | 117 seconds |

EXAMPLE 3

A sheet was prepared in the same manner as described in Example 1 but using 50 parts by weight of the ethylene-butene-1 copolymer and 50 parts by weight of the alumina trihydrate. The resulting sheet was found to have a good surface condition and had the following properties:

| | |
|---|---|
| Torsional Rigidity: | $32.3 \times 10^2$ kg/cm$^2$ (longitudinal direction), $27.0 \times 10^2$ kg/cm$^2$ (lateral direction) |
| Tear Strength: | 46.8 kg/cm (longitudinal direction) 30.5 kg/cm (lateral direction) |
| Heat of Combustion: | 5440 Kcal/kg |
| Oxygen Index: | 27.0 (flame-retarding) |
| Acid Resistance: | 0% (in both longitudinal and lateral directions) |
| Arc Resistance: | 193 seconds |

COMPARATIVE EXAMPLE 2

A sheet was prepared from 5 parts by weight of the ethylene-butene-1 copolymer and 95 parts by weight of the alumina trihydrate in the same manner as described in Example 1 but this attempt failed.

EXAMPLE 4

A sheet was prepared in the same manner as described in Example 1 but using an ethylene homopolymer having a melt index of 40 g/10 minutes as measured under the same conditions as described in Example 1 and a density of 0.95 g/cc (manufactured by Japan Olefin Chemical Company under the trade name Sholex) in place of the ethylene-butene-1 copolymer. The resulting sheet was found to have a good surface condition and had the following properties:

| | |
|---|---|
| Torsional Rigidity: | 42.0 × 10² kg/cm² (longitudinal direction), 36.9 × 10³ kg/cm² (lateral direction) |
| Tear Strength: | 29.1 kg/cm (longitudinal direction) 18.1 kg/cm (lateral direction) |
| Heat of Combustion: | 3,300 Kcal/kg |
| Oxygen Index: | 32.1 (flame-retarding) |
| Acid Resistance: | 0% (in both longitudinal and lateral directions) |
| Arc Resistance: | 195 seconds |

COMPARATIVE EXAMPLE 3

A sheet was prepared in the same manner as described in Example 1 but using alumina hydrate having a boehmite crystal structure [α-AlO(OH)] in place of the alumina trihydrate having a gibbsite crystal structure. The resulting sheet had a significantly poor surface condition (not uniform and having many white spots) and had the following properties:

| | |
|---|---|
| Torsional Rigidity: | 50.5 × 10² kg/cm² (longitudinal direction), 42.5 × 10² kg/cm² (lateral direction) |
| Tear Strength: | 6.6 kg/cm (longitudinal direction) 5.8 kg/cm (lateral direction) |
| Heat of Combustion: | 3360 Kcal/kg |
| Oxygen Index: | 20.6 (easily flammable) |
| Acid Resistance: | 0% (both in longitudinal and lateral directions) |
| Arc Resistance: | 118 seconds |

COMPARATIVE EXAMPLE 4

A sheet was prepared in the same manner as described in Example 1 but using alumina hydrate having a bayerite crystal structure [β-Al(OH)₃] in place of the alumina trihydrate having a gibbsite crystal structure. The resulting sheet had a poor surface condition having white spots and had the following properties:

| | |
|---|---|
| Torsional Rigidity: | 49.1 × 10³ kg/cm² (longitudinal direction), 38.7 × 10³ kg/cm² (lateral direction) |
| Tear Strength: | 7.2 kg/cm (longitudinal direction) 6.0 kg/cm (lateral direction) |
| Heat of Combustion: | 3300 Kcal/kg |
| Oxygen Index: | 29.5 (flame-retarding) |
| Acid Resistance: | 0% (in both longitudinal and lateral directions) |
| Arc Resistance: | 165 seconds |

COMPARATIVE EXAMPLE 5

A sheet was prepared in the same manner as described in Example 1 but using calcium carbonate in place of the alumina trihydrate. The resulting sheet had a slightly poor surface condition (slightly lacking uniformity and having white spots) and had the following properties:

| | |
|---|---|
| Torsional Rigidity: | 52.5 × 10³ kg/cm² (longitudinal direction), 48.1 × 10³ kg/cm² (lateral direction) |
| Tear Strength: | 9.2 kg/cm (longitudinal direction) 8.3 kg/cm (lateral direction) |
| Heat of Combustion: | 3400 Kcal/kg |
| Oxygen Index: | 20.6 (easily flammable) |
| Acid Resistance: | 15% (longitudinal direction) 22% (lateral direction) |
| Arc Resistance: | 142 seconds |

COMPARATIVE EXAMPLE 6

A sheet was prepared in the same manner as described in Example 1 but using calcium sulfate dihydrate in place of the alumina trihydrate. The resulting sheet had a poor surface condition (lacking uniformity and having white spots) and had the following properties:

| | |
|---|---|
| Torsional Rigidity: | 41.8 × 10³ kg/cm² (longitudinal direction), 22.3 × 10³ kg/cm² (lateral direction) |
| Tear Strength: | 30.8 kg/cm (longitudinal direction) 8.2 kg/cm (lateral direction) |
| Heat of Combustion: | 3450 Kcal/kg |
| Oxygen Index: | 20.1 (easily flammable) |
| Acid Resistance: | 7% (longitudinal direction), 12% (lateral direction) |
| Arc Resistance: | 101 seconds |

EXAMPLE 5

30 parts by weight of a high density polyethylene having a melt index of 5.0 g/10 minutes as measured under a load of 21.6 kg at a temperature of 190°C and a density of 0.96 g/cc (manufactured by Japan Olefin Chemical Company under the trade name Sholex) and 70 parts by weight of alumina trihydrate having a gibbsite crystal structure and having an average particle size of 40 microns were mixed in a pressurized twin arm kneader at a temperature of 160° ± 5°C for about 15 minutes. The resulting mixture was supplied to a calender roll maintained at a temperature of 150°C to form a sheet having a thickness of 0.16 mm. The sheet thus obtained was then stretched in a 10% aqueous solution of sodium aluminate at a temperature of from 90° to 95°C over a period of 5 minutes to prepare a sheet having a thickness of 0.15 mm. The sheet thus treated had the following properties:

| | |
|---|---|
| Tear Strength: | 11.6 kg/cm (longitudinal direction) 13.8 kg/cm (lateral direction) (well balanced mechanically) |
| Cloud Point: | 39.1% |
| Gloss: | 4.3% |
| Whiteness: | Good |
| Surface Condition: | Uniform |
| Markability: | Good |
| Electrostatic Charging: | 2 seconds |
| Heat of Combustion: | 3300 Kcal/kg |
| Oxygen Index: | 31.3 (flame-retarding) |

The same sheet as above which was not subjected to the above treatment with aqueous sodium aluminate had the following properties:

| | |
|---|---|
| Cloud Point: | 40.9% |
| Gloss: | 10.6% |
| Whiteness: | Poor |
| Markability: | Poor |
| Electrostatic Charging: | 133 seconds |

EXAMPLE 6

A sheet was prepared in the same manner as described in Example 5 but using 15 parts by weight of the high density polyethylene and 85 parts by weight of the alumina trihydrate and the resulting sheet was treated with the aqueous solution of sodium aluminate as described in Example 5. The sheet thus obtained had the following properties:

| | |
|---|---|
| Tear Strength: | 8.3 kg/cm (longitudinal direction) |
| | 9.9 kg/cm (lateral direction) |
| Cloud Point: | 90.0% |
| Gloss: | 4.2% |
| Whiteness: | Good |
| Surface Condition: | Uniform |
| Markability: | Good |
| Electrostatic Charging: | 1 second |
| Heat of Combustion: | 1650 Kcal/kg |
| Oxygen Index: | 33.9 (flame-retarding) |

EXAMPLE 7

A sheet was prepared in the same manner as described in Example 5 but using 50 parts by weight of the high density polyethylene and 50 parts by weight of the alumina trihydrate and the resulting sheet was treated with the aqueous solution of sodium aluminate as described in Example 5. The sheet thus obtained had the following properties:

| | |
|---|---|
| Tear Strength: | 16.6 kg/cm (longitudinal direction) |
| | 17.5 kg/cm (lateral direction) |
| Cloud Point: | 78.3% |
| Gloss: | 6.6% |
| Whiteness: | Good |
| Surface Condition: | Uniform |
| Markability: | Fairly good |
| Electrostatic Charging: | 3 seconds |
| Heat of Combustion: | 5400 Kcal/kg |
| Oxygen Index: | 27.0 (flame-retarding) |

EXAMPLE 8

A. 30 parts by weight of a high density polyethylene having a melt index of 0.6 g/10 minutes as measured under a load of 21.6 Kg at a temperature of 190°C and a density of 0.96 g/cc (manufactured by Japan Olefin Chemical K.K. under the trade name Sholex), 70 parts by weight of alumina trihydrate of a gibbsite crystal structure having an average particle size of 46 microns (manufactured by Showa Denko K.K. under the trade name Higilite) and 3 parts by weight of fumaric acid were blended by a hot roll for about 10 minutes at a temperature of from 150° – 160°C and the blend was pressed into sheets having a thickness of about 3.0 mm. The resulting sheet was then placed between aluminum foils having a thickness of 0.03 mm (JIS H-4191) and the laminate thus obtained was heat-pressed at a temperature of 160°C under a pressure of 50 Kg/cm² for 5 minutes. The laminate was then cooled to room temperature using a water-cooling press (under a pressure of 50 Kg/cm²). The bonded laminate thus obtained showed a peel strength of 9.6 Kg/2.5 cm width.

B. A bonded laminate was prepared in the same manner as described in (A) above except for using no fumaric acid. The bonded laminate thus obtained showed a peel strength of 1.2 Kg/ 2.5 cm width.

EXAMPLE 9

A. A bonded laminate was prepared in the same manner as described in Example 8(A) except for using 20 parts by weight of the same high density polyethylene and 80 parts by weight of the same alumina trihydrate as were used in Example 8(A). The laminate thus obtained showed a peel strength of 11.5 Kg/2.5 cm width.

B. A bonded laminate was prepared in the same manner as described in (A) above except for using no fumaric acid. The bonded laminate thus obtained showed a peel strength of 2.4 Kg/ 2.5 cm width.

EXAMPLE 10

A. A bonded laminate was prepared in the same manner as described in Example 8(A) except for using 7 parts by weight of the same high density polyethylene and 93 parts by weight of the same alumina trihydrate as were used in Example 8(A). The laminate thus obtained showed a peel strength of 13.2 Kg/2.5 cm width.

B. A bonded laminate was prepared in the same manner as described in (A) above except for using no fumaric acid. The laminate thus obtained showed a peel strength of 2.8 Kg/2.5 cm width.

EXAMPLE 11

A. A bonded laminate was prepared in the same manner as described in Example 8(A) except for using 50 parts by weight of the same high density polyethylene and 50 parts by weight of the same alumina trihydrate as were used in Example 8(A). The laminate thus obtained showed a peel strength of 8.5 Kg/2.5 cm width.

B. A bonded laminate was prepared in the same manner as described in (A) above except for using no fumaric acid. The laminate thus obtained showed a peel strength less than 1.0 Kg/2.5 cm width.

COMPARATIVE EXAMPLE 7

A bonded laminate was prepared in the same manner as described in Example 8(A) except for using 75 parts by weight of the same high density polyethylene and 25 parts by weight of the same alumina trihydrate as were used in Example 8(A). The laminate thus obtained showed a peel strength of 2.3 Kg/2.5 cm width.

EXAMPLE 12

A bonded laminate was prepared in the same manner as described in Example 8(A) with the exception that fumaric acid was used in an amount of 1.0 part by weight. The laminate thus obtained showed a peel strength of 10.8 Kg/2.5 cm width.

EXAMPLE 13

A bonded laminate was prepared in the same manner as described in Example 8(A) with the exception that fumaric acid was used in an amount of 0.5 parts by weight. The laminate thus obtained showed a peel strength of 9.2 Kg/2.5 cm width.

EXAMPLE 14

A bonded laminate was prepared in the same manner as described in Example 8(A) with the exception that fumaric acid was used in an amount of 0.2 parts by weight. The laminate thus obtained showed a peel strength of 6.1 Kg/2.5 cm width.

EXAMPLE 15

A bonded laminate was prepared in the same manner as described in Example 8(A) with the exception that fumaric acid was used in an amount of 7.0 parts by weight. The laminate thus obtained showed a peel strength of 8.4 Kg/2.5 cm width.

EXAMPLE 16

A bonded laminate was prepared in the same manner as described in Example 8(A) with the exception that fumaric acid was used in an amount of 14.0 parts by weight. The laminate thus obtained showed a peel strength of 3.6 Kg/2.5 cm width.

EXAMPLE 17

A bonded laminate was prepared in the same manner as described in Example 8(A) with the exception that an ethylene-butene-1 copolymer having a melt index of 0.05 g/10 minutes (2.16 Kg, 190°C) and a density of 0.94 g/cc (manufactured by Japan Olefin Chemical K.K. under the trade name Sholex) was used in the same amount in place of the high density polyethylene used in Example 8(A). The bonded laminate thus obtained showed a peel strength of 6.5 Kg/2.5 cm width.

EXAMPLE 18

A bonded laminate was prepared in the same manner as described in Example 8(A) with the exception that an ethylene-butene-1 copolymer having a melt index of 5.0 g/10 minutes (21.6 Kg, 190°C) and a density of 0.95 g/cc (manufactured by Japan Olefin Chemical K.K. under the trade name Sholex) was used in the same amount in place of the high density polyethylene used in Example 8(A). The bonded laminate thus obtained showed a peel strength of 11.5 Kg/2.5 cm width.

EXAMPLE 19

A bonded laminate was prepared in the same manner as described in Example 8(A) with the exception that an ethylenevinyl acetate copolymer containing 10% by weight of vinyl acetate and having a melt index of 3.0 g/10 minutes (2.16Kg, 190°C) and a density of 0.90 g/cc (manufactured by Sumitomo Chemical Co., Ltd. under the trade name "Evatate") was used in the same amount in place of the high density polyethylene used in Example 8(A). The bonded laminate thus obtained showed a peel strength of 9.5 Kg/2.5 cm width.

EXAMPLE 20

A bonded laminate was prepared in the same manner as described in Example 8(A) with the exception that a stainless steel plate (SUS 27) having a thickness of 1 mm previously degreased with trichloroethylene was used in place of the aluminum foil used in Example 8(A). The bonded laminate thus obtained showed a peel strength of 9.2 Kg/2.5 cm width.

EXAMPLE 21

A bonded laminate was prepared in the same manner as described in Example 8(A) with the exception that a galvanized sheet steel having a thickness of 0.2 mm previously degreased with trichloroethylene was used in place of the aluminum foil used in Example 8(A). The bonded laminate thus obtained showed a peel strength of 3.8 Kg/2.5 cm width.

EXAMPLE 22

A bonded laminate was prepared in the same manner as described in Example 8(A) except for using a kraft paper in place of the aluminum foil used in Example 8(A). The bonded laminate thus obtained showed a peel strength of more than 8.5 Kg/2.5 cm width (with breaking of the kraft paper).

EXAMPLES 23-27

A bonded laminate was prepared in the same manner as described in Example 8(A) with the exception that each of the unsaturated carboxylic acids shown in Table 1 below was used in an amount of 3.0 parts by weight in place of the fumaric acid used in Example 8(A). The peel strength obtained in each bonded laminate thus obtained is shown below:

Table 1

| Example No. | Unsaturated Carboxylic Acid | Peel Strength (Kg/2.5 cm width) |
| --- | --- | --- |
| 23 | itaconic acid | 6.5 |
| 24 | oleinic acid | 5.8 |
| 25 | cinnamic acid | 6.7 |
| 26 | methacrylic acid | 7.8 |
| 27 | chrotonic acid | 6.6 |

EXAMPLE 28

22.1 parts by weight of the high density ethylene polymer used in Example 1, 7.2 parts by weight of atactic polypropylene having a molecular weight of 20 $\times 10^4$ and 77.9 parts by weight of alumina trihydrate having a gibbsite crystal structure having an average particle size of 46 microns (manufactured by Showa Denko K.K. under the trade name Higilite) were kneaded in a twin-art kneader at a temperature of 160° to 170°C for 10 minutes and immediately thereafter a sheet having a thickness of about 2 mm was prepared by a hot roll maintained at 155° ± 5°C. The resulting sheet was then heat-pressed using a hot press at about 250°C under a pressure of 1 Kg/cm$^2$ for 3 minutes to prepare a foamed sheet. The foamed sheet contained uniform discrete voids having a bulk density of about 0.9. The foamed sheet was stretched by passing through 10 inch rolls at room temperature while maintaining the clearance of the rolls at 1.5 mm. The resulting stretched sheet was found to have a torsional rigidity of 280 Kg/cm$^2$ in the longitudinal direction and 390 Kg/cm$^2$ in the lateral direction, and also to be flame retarding, having an oxygen index of 28.6.

EXAMPLE 29 a. 20 parts by weight of an ethylene homopolymer having a melt index of 0.1 g/10 minutes as determined under a load of 2.16 Kg and at a temperature of 190°C and a density of 0.96 g/cc (manufactured by Japan Olefin Chemical K.K. under the trade name Sholex) and 80 parts by weight of alumina trihydrate having a gibbsite crystal structure of 46 microns in average particle size (manufactured by Showa Denko K.K. under the trade name Higilite) were kneaded in a twin-arm kneader maintained at a temperature of 160 ± 5°C for a period of about 5 minutes and a sheet having a thickness of 1 mm was prepared by using a hot roll maintained at a temperature of 150°C. Aluminum foils having a thickness of 0.1 mm previously degreased with trichloroethylene were placed on both surfaces of the sheet thus prepared and subjected to a hot press at a temperature of 170°C under a pressure of 100 Kg/cm$^2$ for 5 minutes and then cooled by a press at a temperature of 20°C under a pressure of 30 Kg/cm$^2$ to prepare a test piece. The resulting test piece showed a peel strength of 2.4 Kg/2.5 cm width.

B. A sheet was prepared in the same manner as described in (A) above except for using no alumina trihydrate. The sheet thus obtained was found to have no flame retarding property, having an oxygen index of 18.1. A test piece prepared by bonding aluminum foil 0.1 mm thick to both surfaces of the sheet prepared in (A) above showed a peel strength of less than 0.2 Kg/2.5 cm width.

EXAMPLE 30

A. A sheet was prepared in the same manner as described in Example 29(A) except for using an ethylene-butene-1 copolymer having a melt index of 5.0 g/10 minutes and a density of 0.95 g/cm (manufactured by Japan Olefin Chemical K.K. under the trade name Sholex) in the same amount in place of the ethylene homopolymer used in Example 29(A). The sheet thus prepared was found to be flame retarding, having an oxygen index of 32.9. A test piece was prepared in the same manner as described in Example 29(A) with the exception that an aluminum foil was placed on the sheet in obtained (A) above using a hot press under a pressure of 80 Kg/cm$^2$. The test piece thus obtained showed a peel strength of 2.9 Kg/2.5 cm width.

B. A sheet was prepared in the same manner as described in Example 29(A) except for using no alumina trihydrate having a gibbsite crystal structure. The sheet thus obtained was found to be flammable, having an oxygen index of 18.0. An aluminum foil was placed on the sheet to prepare a bonded laminate test piece. The test piece thus obtained showed a peel strength of 2.9 Kg/2.5 cm width.

EXAMPLE 31

A sheet was prepared in the same manner as described in Example 30(A) except for using 15 parts by weight of the same ethylene-butene-1 copolymer and 85 parts by weight of the same alumina trihydrate as were used in Example 30(A). The resulting sheet was found to be flame retarding, having an oxygen index of 34.2. An aluminum foil was placed on the sheet in the same manner as described in Example 30(A) to prepare a bonded laminate test piece. The test piece thus obtained showed a peel strength of 8.3 Kg/2.5 cm width.

EXAMPLE 32

A sheet was prepared in the same manner as described in Example 30(A) except for using 8 parts by weight of the same ethylene-butene-1 copolymer and 92 parts by weight of the same alumina trihydrate as were used in Example 30(A). The resulting sheet was found to be flame retarding, having an oxygen index of 35.2. An aluminum foil was placed on the sheet to prepare a bonded laminate test piece. The test piece thus obtained showed a peel strength of 3.6 Kg/2.5 cm width.

EXAMPLE 33

A sheet was prepared in the same manner as described in Example 31 except for using alumina trihydrate of a gibbsite crystal structure having an average particle size of 1.5 microns in place of that used in Example 31. The resulting sheet was found to be flame retarding, having an oxygen index of 34.2. An aluminum foil was placed on the sheet to prepare a bonded laminate test piece. The test piece thus obtained showed a peel strength of 3.5 Kg/2.5 cm width.

EXAMPLE 34

A. A sheet was prepared in the same manner as described in Example 29(A) with the exception that an ethylene-vinyl acetate copolymer containing 25% by weight of vinyl acetate having a melt index of 8.0 g/cm and a density of 0.95 g/cc (manufactured by Sumitomo Chemical Co., Ltd. under the trade name "Evatate") was used in the same amount in place of the ethylene homopolymer used in Example 29(A) and alumina trihydrate of a gibbsite crystal structure having an average particle size of 1.5 microns was used in place of that used in Example 29(A). The resulting sheet was found to be flame retarding, having an oxygen index of 32.8. A bonded laminate test piece was prepared by a hot press in the same manner as described in Example 29(A) with the exception that the aluminum foils were placed on the sheet by a hot press under a pressure of 50 Kg/cm$^2$. The test piece thus prepared showed a peel strength of 5.5 Kg/2.5 cm width.

B. A sheet was prepared in the same manner as described in (A) above except for using no alumina trihydrate having a gibbsite crystal structure. The resulting sheet was found to be flammable, having an oxygen index of 13.0. A test piece was prepared by placing an aluminum foil on the sheet. The test piece thus obtained showed a peel strength of 3.8 Kg/2.5 cm width.

EXAMPLE 35

A sheet was prepared in the same manner as described in Example 34 except for using 15 parts by weight of the same ethylene-vinyl acetate copolymer and 85 parts by weight of the same alumina trihydrate of a gibbsite crystal structure (except having an average particle size of 46 microns) as were used in Example 34. The resulting sheet was found to be flame retarding, having an oxygen index of 38.6. Aluminum foils were placed on the sheet in the same manner as described in Example 34 to prepare a bonded laminate test piece. The test piece thus obtained showed a peel strength of 5.7 Kg/2.5 cm width.

EXAMPLE 36

A. 30 parts by weight of an ethylene-vinyl acetate copolymer containing 10% by weight of vinyl acetate and having a melt index of 3.0 g/10 minutes (2.16 Kg, 190°C) and a density of 0.98 g/cc (manufactured by Sumitomo Chemical Co., Ltd. under the trade name Evatate) and 80 parts by weight of the same alumina trihydrate having a gibbsite crystal structure as was used in Example 29(A) were kneaded in the same manner as described in Example 34 to prepare a sheet. The resulting sheet was found to be flame retarding, having an oxygen index of 32.7. Aluminum foils were placed on the sheet in the same manner as described in Example 34 to prepare a bonded laminate test piece. The test piece thus obtained showed a peel strength of 5.4 Kg/2.5 cm width.

B. A sheet was prepared in the same manner as described in (A) above except for using no alumina trihydrate having a gibbsite crystal structure. The resulting sheet was found to be flammable, having an oxygen index of 17.8. A bonded laminate test piece prepared by placing an aluminum foil on the sheet showed a peel strength of 8.4 Kg/2.5 cm width.

COMPARATIVE EXAMPLE 8

A sheet was prepared in the same manner as described in Example 29(A) except for using 24 parts by weight of the same ethylene homopolymer and 76 parts by weight of the same alumina trihydrate having a gibbsite crystal structure as those used in Example 29(A). The resulting sheet was found to be flame retarding, having an oxygen index of 32.8. An aluminum foil was placed on both surfaces of the sheet in the same manner as described in Example 29(A) to prepare a bonded laminate test piece. The resulting test piece showed a peel strength of 0.3 Kg/2.5 cm width.

COMPARATIVE EXAMPLE 9

A sheet was prepared in the same manner as described in Example 29(A) with the exception that alumina hydrate of a boehmite crystal structure [$\alpha$-AlO(OH)] having an average particle size of 3.0 microns was used in place of the alumina trihydrate having a gibbsite crystal structure used in Example 29(A). The resulting sheet was found to have a flame retarding property, having an oxygen index of 39.8. The sheet was placed between aluminum foils in the same manner as described in Example 29(A) to prepare a test piece. The resulting test piece showed a peel strength of 0.8 Kg/2.5 cm width.

COMPARATIVE EXAMPLE 10

A sheet was prepared in the same manner as described in Example 29(A) with the exception that alumina hydrate having a bayerite crystal structure [$\beta$-Al(OH)$_3$] of 1.3 microns in average particle size was used in place of alumina trihydrate having a gibbsite crystal structure used in Example 29(A). The resulting sheet was found to have a flame retarding property, having an oxygen index of 30.2. Aluminum foils were placed on both surfaces of the sheet in the same manner as described in Example 29(A) to prepare a bonded laminate test piece. The test piece thus obtained showed a peel strength of 0.6 Kg/2.5 cm width.

EXAMPLE 37

75 parts by weight of alumina trihydrate (manufactured by Showa Denko K.K. under the trade name Higilite, average particle diameter 46 microns), 1 part by weight of titanium dioxide, average particle diameter about 46 microns (the proportion of alumina trihydrate in the inorganic filler, 98.6% by weight), 20 parts by weight of a high density polyethylene having a melt index of 0.1 g/10 minutes as determined under a load of 2.16 Kg and at a temperature of 190°C and having a density of 0.94 g/cc (manufactured by Showa Petrochemical K.K. under the trade name Sholex) and 4 parts by weight of an ethylene-vinyl acetate copolymer having a density of 0.95 g/cc and a melt index of about 3 (2.16 Kg, 190°C) manufactured by Sumitomo Chemical Co., Ltd. under the trade name Evatate, vinyl acetate content, 25% by weight) (the proportion of the high density polyethylene in the resin composition, 83.3% by weight) were kneaded in a 3 l twinart kneader at a temperature of 160°C for a period of 10 minutes. The resulting mixture was pressed into a core material for an aluminum sandwich having a thickness of 0.9 cm by a hot press (20 Kg/cm$^2$) at the above temperature. The resulting core material was found to be flame retarding, having an oxygen index of 32.6. Onto both surfaces of this core material there was applied a powder mixture consisting of 95 parts by weight of acrylic acid and 5 parts by weight of dicumyl peroxide in a proportion of 4 mg/cm$^2$, and aluminum plates having a thickness of 0.5 mm were placed on both surfaces of the core material under a pressure of 30 Kg/cm$^2$ using a hot press maintained at 160°C for 5 minutes to prepare a plate having heat insulating and accumulating properties. The heat conductivity of the resulting plate was 1.3 Kcal/m.hr°C. The heat insulating property of the plate was also determined by measuring the time required for the temperature to decrease from 60° to 30°C, and was found to be 61 minutes.

EXAMPLE 38

A core material was prepared in the same manner as described in Example 37 except for using 16 parts by weight of the same high density polyethylene and 8 parts by weight of the same ethylene-vinyl acetate copolymer as were used in Example 37 (the proportion of the high density polyethylene in the resin composition, 66.7% by weight). The resulting core material was found to be flame retarding having an oxygen index of 32.1. Aluminum plates were placed on both surfaces of the core material in the same manner as described in Example 37 to prepare a plate having heat insulating and accumulating properties. The heat conductivity of the resulting plate was 1.3 Kcal/m.hr°C. The heat insulating property of the resulting plate was also determined by measuring the time required for the temperature to decrease from 60° to 30°C, and was found to be 61 minutes.

EXAMPLE 39

A core material was prepared in the same manner as described in Example 37 except for using 12 parts by weight of the same high density polyethylene and 12 parts by weight of the same ethylene-vinyl acetate copolymer (the proportion of the high density polyethylene in the resin composition, 50% by weight) as were used in Example 37. The resulting core material was found to be flame retarding having an oxygen index of 31.6. Aluminum plates were placed on both surfaces of the core material in the same manner as described in Example 37 to prepare a plate having heat insulating and accumulating properties. The heat conductivity of the plate thus obtained was 1.2 Kcal/m.hr°C. The time required for the temperature of the plate to decrease from 60° to 30°C was found to be 60 minutes.

EXAMPLE 40

A core material was prepared in the same manner as described in Example 37 except for using 12 parts by weight of the same high density polyethylene, 3 parts by weight of the same ethylene-vinyl acetate copolymer (the proportion of the high density polyethylene in the resin composition, 80% by weight), 80 parts by weight of the same alumina trihydrate and 5 parts by weight of the same titanium dioxide (the proportion of the alumina trihydrate in the inorganic filler, 94.1% by weight) as were used in Example 37. The resulting core material was found to be flame retarding, having an oxygen index of 34.4. Aluminum plates were placed on both surfaces of the core material to prepare a plate having heat insulating and accumulating properties. The heat conductivity of the plate thus obtained was 1.4 Kcal/m.hr°C. The time required for the temperature of the plate to decrease from 60° to 30°C was found to be 67 minutes.

EXAMPLE 41

A core material was prepared in the same manner as described in Example 37 except for using 30 parts by weight of the same high density polyethylene, 6 parts by weight of the same ethylene-vinyl acetate copolymer (the proportion of the high density polyethylene in the resin composition, 83.3% by weight), 60 parts by weight of the same alumina trihydrate and 4 parts by weight of the same titanium dioxide (the proportion of the alumina trihydrate in the inorganic filler, 93.8% by weight) as were used in Example 37. The resulting core material was found to be flame retarding, having an oxygen index of 30.1. An aluminum plate was placed on both surfaces of the core material in the same manner as described in Example 37 to prepare a plate having heat insulating and accumulating properties. The heat conductivity of the plate thus obtained was 1.1 Kcal/m.hr°C. The heat insulating property was also determined by measuring the time required for the temperature to decrease from 60° to 30°C, and was found to be 56 minutes.

EXAMPLE 42

A core material was prepared in the same manner as described in Example 37 except for using 72 parts by weight of the same alumina trihydrate and 4 parts by weight of the same titanium dioxide (the proportion of the alumina trihydrate in the inorganic filler, 94.7% by weight) as were used in Example 37. The resulting core material was found to be flame retarding having an oxygen index of 31.7. Aluminum plates were placed on both surfaces of the core material in the same manner as described in Example 37 to prepare a plate having heat insulating and accumulating properties. The heat conductivity of the plate thus obtained was 1.2 Kcal/m.hr°C. The heat insulating property of the plate was also determined by measuring the time required for the temperature to decrease from 60° to 30°C, and was found to be 62 minutes.

EXAMPLE 43

A core material was prepared in the same manner as described in Example 37 except for using 68 parts by weight of the same alumina trihydrate and 8 parts by weight of the same titanium dioxide (the proportion of the alumina trihydrate in the inorganic filler, 89.5% by weight) as were used in Example 37. The resulting core material was found to be flame retarding, having an oxygen index of 31.0. Aluminum plates were placed on both surfaces of the core material in the same manner as described in Example 37 to prepare a plate having heat insulating and accumulating properties. The heat conductivity of the plate thus obtained was 1.2Kcal/m.hr°C. The time required for the temperature of the plate to decrease from 60° to 30°C was found to be 61 minutes.

COMPARATIVE EXAMPLE 11

A core material was prepared in the same manner as described in Example 37 except for using 76 parts by weight of the same alumina trihydrate as was used in Example 37 (using no titanium dioxide). The resulting core material was found to be flame retarding, having an oxygen index of 32.8. An aluminum plate was placed on the core material in the same manner as described in Example 37 to prepare a plate having heat insulating and accumulating properties. The heat conductivity of the plate thus obtained was 1.3 Kcal/m.hr°C. The heat insulating property of the plate was also determined by measuring the time required for the temperature to decrease from 60° to 30°C, and was found to be 61 minutes.

COMPARATIVE EXAMPLE 12

A core material was prepared in the same manner as described in Example 37 except for using 24 parts by weight of the same high density polyethylene (using no ethylene-vinyl acetate copolymer), 75 parts by weight of the same alumina trihydrate and 1 part of the same titanium dioxide (the proportion of the alumina trihydrate in the inorganic filler, 98.6% by weight) as were used in Example 37. The resulting core material was found to be flame retarding, having an oxygen index of 33.1. However, it was impossible to prepare a heat insulating and accumulating plate in the same manner as described in Example 37 by bonding an aluminum plate to the core material thus obtained due to the poor adhesive strength.

COMPARATIVE EXAMPLE 13

A core material was prepared in the same manner as described in Example 37 except for using 50 parts by weight of the same high density polyethylene, 20 parts by weight of the same ethylene-vinyl acetate copolymer (the proportion of the high density polyethylene in the resin composition, 71.5% by weight), 28 parts by weight of the same alumina trihydrate and 2 parts by weight of the same titanium dioxide (the proportion of the alumina trihydrate in the inorganic filler, 93.5% by weight) as were used in Example 37. The resulting core material was found to be slightly flame retarding, having an oxygen index of 23.2. An aluminum plate was placed on both surfaces of the core material in the same manner as described in Example 37 to prepare a heat insulating and accumulating plate. The heat conductivity of the plate thus obtained was 0.8 Kcal/m.hr°C. The time required for the temperature of the plate to decrease from 60° to 30°C was found to 42 minutes.

COMPARATIVE EXAMPLE 14

2 parts by weight of the same high density polyethylene, 2 parts by weight of the same ethylene-vinyl acetate copolymer (the proportion of the high density polyethylene in the resin composition, 50% by weight), 95 parts by weight of the same alumina trihydrate and 1 part of the same titanium dioxide (the proportion of the alumina trihydrate in the inorganic filler, 99.0% by weight) as were used in Example 37 were kneaded and then heat-pressed in the same manner as described in Example 37. However, the kneading was extremely difficult and the resulting material was found to be too brittle to be used as a core material.

EXAMPLE 45

A core material was prepared in the same manner as described in Example 37 with the exception that a high density polyethylene having a melt index of 0.5 g/10 minutes (determined under a load of 2.16 Kg at a temperature of 190°C) and a density of 0.96 g/cc (manufactured by Showa Petrochemical K.K. under the trade name Sholex) was used in place of the high density polyethylene used in Example 37. The resulting core material was found to be flame retarding, having an oxygen index of 32.4. Aluminum plates were placed on both surfaces of the core material in the same manner as described in Example 37 to prepare a heat insulating and accumulating plate. The heat conductivity of the plate thus obtained was 1.3 Kcal/m.hr°C. The time required for the temperature of the plate to decrease from 60° to 30°C was found to be 60 minutes.

EXAMPLE 46

A core material was prepared in the same manner as described in Example 37 with the exception that alumina of substantially the same size was used in the same amount in place of the titanium dioxide used in Example 37. The resulting core material was found to be flame retarding, having an oxygen index of 32.4. Aluminum plates were placed on both surfaces of the material in the same manner as described in Example 37 to prepare a heat insulating and accumulating plate. The heat conductivity of the plate thus obtained was 1.3 Kcal/m.hr°C. The time required for the temperature of the plate to decrease from 60° to 30°C was found to be 60 minutes.

EXAMPLE 47

A core material was prepared in the same manner as described in Example 37 with the exception that silica of substantially the same size was used in the same amount in place of the titanium dioxide used in Example 37. The resulting core material was found to be flame retarding, having an oxygen index of 32.3. Aluminum plates were placed on both surfaces of the core material in the same manner as described in Example 37 to prepare a heat insulating and accumulating plate. The heat conductivity of the plate thus obtained was 1.2 Kcal/m.hr°C. The time required for the temperature of the plate to decrease from 60° to 30°C was found to be 62 minutes.

EXAMPLE 48

A core material was prepared in the same manner as described in Example 37 with the exception that ferrous oxide of substantially the same size was used in the same amount in place of the titanium dioxide used in Example 37. The resulting core material was found to be flame retarding, having an oxygen index of 32.5. Aluminum plates were placed on both surfaces of the core material above obtained in the same manner as described in Example 37 to prepare a heat insulating and accumulating plate. The heat conductivity of the plate thus obtained was 1.3 Kcal/m.hr°C. The time required for the temperature of the plate to decrease from 60° to 30°C was found to be 60 minutes.

COMPARATIVE EXAMPLE 15

A core material was prepared in the same manner as described in Example 37 except for using 94 parts by weight of the same high density polyethylene and 6 parts by weight of the same ethylene-vinyl acetate copolymer as were used in Example 37 (the inorganic filler was not incorporated). The resulting core material was found to be flammable, having an oxygen index of 17.3. Aluminum plates were placed on both surfaces of the core material to prepare a plate having heat insulating and accumulating properties. The heat conductivity of the resulting plate was 0.5 Kcal/m.hr°C. The time required for the temperature of the plate to decrease from 60° to 30°C was found to be 31 minutes, which indicated the poor heat insulating property of the plate.

While the invention has been described in detail and with reference to specific embodiments thereof, it will be apparent to one skilled in the art that various changes and modifications can be made therein without departing from the spirit and scope thereof.

What is claimed is:

1. A resin composition comprising 70 to 5 parts by weight of an ethylene polymer containing at least 80 mol percent ethylene and 30 to 95 parts by weight of alumina trihydrate having a gibbsite crystal structure and containing at least 0.20 percent by weight of fixed sodium compounds represented as $Na_2O$, said alumina trihydrate having a monoclinic crystal system in which the lattice constant is measured as a=8.62 A, b=5.06 A and c=9.70 A, the beta angle is 85°26, and the refractive index is expressed as $\alpha$=1.568, $\beta$=1,568 and $\gamma$=1,587.

2. The resin composition according to claim 1 where the ethylene polymer has a density of 0.90 to 0.98.

3. The resin composition according to claim 1 where the ethylene polymer has a density greater than 0.93 and the alumina trihydrate has an average particle diameter of 100 $\mu$ or less.

4. The resin composition according to claim 3 where the ethylene polymer has a density greater than 0.93 to about 0.96.

5. The resin composition according to claim 3 where the ethylene polymer has a melt index (2.16 Kg at 190°C) of 0.001 to 20.

6. The resin composition according to claim 1 where the ethylene polymer is a high density homopolymer.

7. The resin composition according to Claim 1 where the ethylene polymer is a high density copolymer of at least 80 mol% ethylene and a monomer copolymerizable therewith.

8. The resin composition according to claim 7 where the monomer copolymerizable therewith is a higher $\alpha$-olefin or a vinyl compound.

9. The resin composition according to claim 8 where the higher $\alpha$-olefin has 3-5 carbon atoms and the vinyl compound is a $C_3 - C_5$ vinyl ester.

10. The resin composition according to claim 9 where the vinyl ester is vinyl acetate.

11. The resin composition according to claim 9 where the vinyl ester is saponified up to a saponification degree of 98%.

12. The resin composition according to claim 1 where the resin composition comprises 60 to 7 parts by weight ethylene polymer and 40 to 93 parts by weight alumina trihydrate.

13. The resin composition according to claim 12 where the ethylene polymer is a member selected from the group consisting of a high density ethylene homopolymer; a high density copolymer of ethylene and one or more other $\alpha$-olefins, a copolymer of ethylene and vinyl acetate; and a saponified ethylene-vinyl acetate copolymer, said copolymers containing at least 80 mol% of ethylene.

14. The resin composition according to claim 13 where the ethylene polymer has a density greater than 0.93.

15. The resin composition according to claim 14 where the ethylene polymer has a high load melt index of 0.01 to 10 (21.6 Kg at 190°C).

16. The resin composition according to claim 12 where the ethylene polymer is present in a proportion in the range of from 50 to 15 parts by weight and the alumina trihydrate is present in a proportion in the range of from 50 to 85 parts by weight.

17. The resin composition according to claim 12 where the alumina trihydrate has an average particle size less than 2 microns.

18. A molded article prepared from the resin composition claimed in claim 12.

19. The resin composition according to claim 1 further comprising 0.1 to 15 parts by weight of an unsaturated carboxylic acid based on 100 parts by weight of the total amount of the ethylene polymer and the alumina trihydrate.

20. The resin composition according to claim 19 where the ethylene polymer is a member selected from the group consisting of a high density ethylene homopolymer; a high density copolymer of ethylene and one or more other α-olefins, a copolymer of ethylene and vinyl acetate; and a saponified ethylene-vinyl acetate copolymer, said copolymers containing at least 80 mol% of ethylene.

21. The resin composition according to claim 20 where the ethylene polymer has a density greater than 0.93.

22. The resin composition according to claim 20 where the ethylene polymer has a melt index of 0.001 to 20 (2.16 Kg at 190°C).

23. The resin composition according to claim 20 where the ethylene polymer is present in a proportion in the range of 20 to 50 parts by weight and the alumina trihydrate is present in a proportion in the range of from 80 to 50 parts by weight.

24. The resin composition according to claim 20 where the alumina trihydrate has an average particle size of less than 100 microns.

25. The resin composition according to claim 24 where the alumina trihydrate has an average particle size of from 5 to 70 microns.

26. The resin composition according to claim 20 where the unsaturated carboxylic acid is selected from the group consisting of an aliphatic unsaturated carboxylic acid, an aromatic unsaturated carboxylic acid, an alicyclic unsaturated carboxylic acid and a derivative thereof.

27. The resin composition according to claim 20 where the unsaturated carboxylic acid is selected from the group consisting of fumaric acid, maleic acid, acrylic acid, methacrylic acid, itaconic acid, crotonic acid, oleic acid and cinnamic acid.

28. The resin composition according to claim 20 where the unsaturated carboxylic acid is present in a proportion of from 0.1 to 10 parts by weight based on 100 parts by weight of the total amount of ethylene polymer and the alumina trihydrate.

29. A molded article prepared from the resin composition claimed in claim 20.

30. A resin composition according to claim 1 comprising 40 to 5 parts by weight of the ethylene polymer, 60 to 95 parts by weight of the alumina trihydrate and 5 to 15 parts by weight of a high molecular weight organic substance having a softening point below room temperature, based on 100 parts by weight of the total amount of the ethylene polymer and the alumina trihydrate.

31. The resin composition according to claim 30 where the ethylene polymer is a member selected from the group consisting of a high density ethylene homopolymer; a high density copolymer of ethylene and one or more other α-olefins, a copolymer of ethylene-vinyl acetate; and a saponified ethylenevinyl acetate copolymer, said copolymers containing at least 80 mol% of ethylene.

32. The resin composition according to claim 31 where the ethylene polymer is present in a proportion in the range of from 40 to 10 parts by weight and the alumina trihydrate is present in a proportion in the range of from 60 to 90 parts by weight.

33. The resin composition according to claim 31 where the alumina trihydrate has an average particle size in the range of from 1 to 100 microns.

34. The resin composition according to claim 33 where the alumina trihydrate has an average particle size of from 5 to 70 microns.

35. The resin composition according to claim 33 where the ethylene polymer has a density greater than 0.93.

36. The resin composition according to claim 35 where the ethylene polymer has a melt index of 0.001 to 20 (2.16 Kg at 190°C).

37. The resin composition according to claim 33 where the high molecular weight organic substance is selected from the group consisting of an atactic polypropylene, a polybutadiene rubber, a styrene-butadiene rubber, an acrylonitrile-butadiene rubber, a polychloroprene rubber, an ethylene-propylene copolymer rubber, an ethylene-propylene-diene terpolymer rubber, an isobutyl rubber, a polyisoprene rubber, a rubber comprising an alkylene oxide and an epihalohydrin or an epihalohydrin, a chlorinated polyolefin and a chlorosulfonated polyethylene.

38. A molded article prepared from the resin composition claimed in claim 31.

39. A resin composition according to claim 1 comprising 20 to 5 parts by weight of the ethylene polymer and 80 to 95 parts by weight of the alumina trihydrate.

40. The resin composition according to claim 39 where the alumina trihydrate has an average particle size in the range of from 0.1 to 100 microns.

41. The resin composition according to claim 40 where the alumina trihydrate has a size of 0.1 to 1 micron.

42. A resin composition according to claim 1 comprising 7.5 to 50 parts by weight of the ethylene resin and the alumina trihydrate, the ethylene resin comprising 10 to 94 % by weight of an ethylene polymer and 90 to 6 % by weight of an ethylenevinyl acetate copolymer, and the alumina trihydrate comprising 50 to 92.5 % by weight of alumina trihydrate having a gibbsite crystal structure and containing at least 0.20 % by weight of fixed sodium compounds represented as $Na_2O$ and 20 to 0.5 % by weight of a metal oxide.

43. The resin composition according to claim 42 where the ethylene polymer is a member selected from the group consisting of a high density ethylene homopolymer; a high density copolymer of ethylene and one or more other α-olefins, a copolymer of ethylene and vinyl acetate; and a saponified ethylene-vinyl acetate copolymer, said copolymers containing at least 80 mol% of ethylene.

44. The resin composition according to claim 42 where the alumina trihydrate has an average particle size in the range of from 1 to 100 microns.

45. The resin composition according to claim 44 where the alumina trihydrate has an average particle size of 5 to 20 microns.

46. The resin composition according to claim 43 where the ethylene polymer has a density greater than 0.93.

47. The resin composition according to claim 46 where the ethylene polymer has a melt index of 0.001 to 20 (2.16 Kg at 190°C).

48. The resin composition according to claim 42 where the ethylene-vinyl acetate copolymer contains less than 30% by weight of vinyl acetate and has a density of 0.93 or less and a melt index of 0.1 to 20 (2.16 Kg at 190°C).

49. A molded article prepared from the resin composition claimed in claim 42.

50. The resin composition according to claim 42 where the resin composition further comprises 0.1 to 4.0 parts by weight of an unsaturated carboxylic acid based on 100 parts by weight of the resin composition.

51. The resin composition according to claim 42 where the resin composition further comprises 0.01 to 0.2 parts by weight of an organic peroxide.

52. The resin composition according to claim 51 where the organic peroxide is selected from the group consisting of 1,1-bis-tert-butylperoxy-3,3,5-trimethylcyclohexane, 2,5-dimethylhexane-2,5-dihydroperoxide, dicumylperoxide, benzoylperoxide and 2,5-dimethyl-2,5-dibenzoylperoxyhexane.

53. The resin composition according to claim 30 where the high molecular weight organic substance has a molecular weight greater than 10,000.

54. The resin composition according to claim 1, wherein said resin composition contains 0.1 to 5 parts by weight per 100 parts by weight of said resin composition of a metal salt of a higher aliphatic acid selected from the group consisting of barium stearate, calcium stearate, magnesium stearate, aluminum stearate, cadmium stearate, and zinc stearate.

* * * * *